(12) United States Patent
Ramsay

(10) Patent No.: US 12,375,605 B2
(45) Date of Patent: *Jul. 29, 2025

(54) AUTOMATED SYSTEMS FOR COMMUNICATIONS ANALYSIS ACCORDING TO RECORDING RESTRICTIONS

(71) Applicant: LIVEPERSON, INC., New York, NY (US)

(72) Inventor: Bruce Ramsay, Novato, CA (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,763

(22) Filed: May 31, 2024

(65) Prior Publication Data

US 2024/0372946 A1 Nov. 7, 2024

Related U.S. Application Data

(63) Continuation of application No. 18/541,344, filed on Dec. 15, 2023, now Pat. No. 12,041,202.

(Continued)

(51) Int. Cl.
*H04M 3/00* (2024.01)
*G10L 15/06* (2013.01)
(Continued)

(52) U.S. Cl.
CPC ......... *H04M 3/5175* (2013.01); *G10L 15/063* (2013.01); *G10L 15/1815* (2013.01); *G10L 15/22* (2013.01); *H04M 3/42221* (2013.01)

(58) Field of Classification Search
CPC ........... H04M 3/5175; H04M 3/42221; G10L 15/063; G10L 15/1815; G10L 15/22
(Continued)

(56) References Cited

U.S. PATENT DOCUMENTS 9,571,638 B1 * 2/2017 Knighton ................ G10L 15/26
11,250,876 B1 * 2/2022 McCloskey ............ G06N 20/10
(Continued)

*Primary Examiner* — William J Deane, Jr.
(74) *Attorney, Agent, or Firm* — POLSINELLI LLP

(57) ABSTRACT

Disclosed embodiments provide a framework for automatically establishing recording parameters according to specified recording restrictions and generating analytics corresponding to communications recorded subject to the recording restrictions. During a communications session between a user and an agent, a system can identify any recording restrictions corresponding to user communications exchanged during the communications session. The system automatically processes, in real-time, communications exchanged during the communications session as these communications are exchanged to identify the user communications and agent communications. The system generates a transcript that includes the agent communications but selectively records and transcribes the user communications according to the recording restrictions. A machine learning algorithm is trained to generate a set of inferences corresponding to a user sentiment based on historic recordings and transcripts of historic communications sessions between users and agents, as well as corresponding feedback. From the set of inferences, the system generates agent analytics.

21 Claims, 11 Drawing Sheets

Related U.S. Application Data

(60) Provisional application No. 63/433,614, filed on Dec. 19, 2022.

(51) Int. Cl.
   *G10L 15/18* (2013.01)
   *G10L 15/22* (2006.01)
   *H04M 3/42* (2006.01)
   *H04M 3/51* (2006.01)

(58) Field of Classification Search
   USPC ....... 379/265.01–265.14, 266.01–266.1, 309
   See application file for complete search history.

(56) References Cited

U.S. PATENT DOCUMENTS

| | | | | |
|---|---|---|---|---|
| 11,645,551 | B2 * | 5/2023 | Guttmann | G06F 18/231 |
| | | | | 706/45 |
| 11,765,267 | B2 * | 9/2023 | Cole | G06N 20/00 |
| | | | | 379/68 |
| 11,956,385 | B2 * | 4/2024 | Kaniganti | H04M 3/5166 |
| 2019/0294927 | A1 * | 9/2019 | Guttmann | G10L 15/065 |
| 2020/0151577 | A1 * | 5/2020 | Ogawa | G06Q 20/4016 |
| 2020/0243094 | A1 * | 7/2020 | Thomson | G10L 15/28 |
| 2022/0210268 | A1 * | 6/2022 | Cole | H04M 3/5141 |

* cited by examiner

AUTOMATED SYSTEMS FOR COMMUNICATIONS ANALYSIS ACCORDING TO RECORDING RESTRICTIONS

CROSS-REFERENCE TO RELATED APPLICATIONS

This application is a continuation of U.S. patent application Ser. No. 18/541,344 filed Dec. 15, 2023, which claims the priority benefit of U.S. provisional patent application No. 63/433,614 filed Dec. 19, 2022, the disclosures of which are incorporated by reference herein.

FIELD

The present disclosure relates generally to systems and methods for automatically establishing recording parameters according to specified recording restrictions and generating analytics corresponding to communications recorded subject to the recording restrictions.

SUMMARY

Disclosed embodiments provide a framework for automatically establishing recording parameters according to specified recording restrictions and generating analytics corresponding to communications recorded subject to the recording restrictions. According to some embodiments, a computer-implemented method is provided. The computer-implemented method comprises receiving a request to initiate a communications session with an agent. The request is associated with a user. Further, the request indicates an intent. The computer-implemented method further comprises establishing the communications session associated with the intent. The communications session is established between the user and the agent. The computer-implemented method further comprises identifying one or more recording restrictions corresponding to user communications exchanged during the communications session. The computer-implemented method further comprises automatically processing, in real-time, communications exchanged during the communications session as the communications are exchanged to identify the user communications associated with the user and agent communications associated with the agent. The computer-implemented method further comprises generating a recording. The recording includes at least the agent communications. Further, the recording is generated according to the one or more recording restrictions. The computer-implemented method further comprises dynamically training a machine learning algorithm to generate a set of inferences corresponding to user sentiment associated with the intent. The machine learning algorithm is dynamically trained using historic recordings corresponding to historic communications sessions between users and agents, and feedback corresponding to the historic communications sessions. The computer-implemented method further comprises generating agent analytics corresponding to the intent. The agent analytics are generated based on the set of inferences and the recording.

In some embodiments, the one or more recording restrictions are obtained in real-time during the communications session. The recording includes other user communications exchanged prior to obtaining the one or more recording restrictions.

In some embodiments, identifying the one or more recording restrictions includes automatically prompting the user to determine whether to provide affirmative consent for recording the user communications. Further, identifying the one or more recording restrictions includes receiving a user response. The user response indicates that the affirmative consent is not provided.

In some embodiments, the one or more recording restrictions are automatically identified using a bot.

In some embodiments, generating the agent analytics includes identifying a set of agent training needs. The set of agent training needs correspond to actions performable to improve agent responses to intents.

In some embodiments, identifying the one or more recording restrictions includes automatically determining a location associated with the user. Identifying the one or more recording restrictions further includes identifying a set of regulations corresponding to the location. The set of regulations define the one or more recording restrictions.

In some embodiments, the computer-implemented method further comprises automatically deleting previously recorded user communications. The previously recorded user communications are automatically deleted in response to the one or more recording restrictions.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
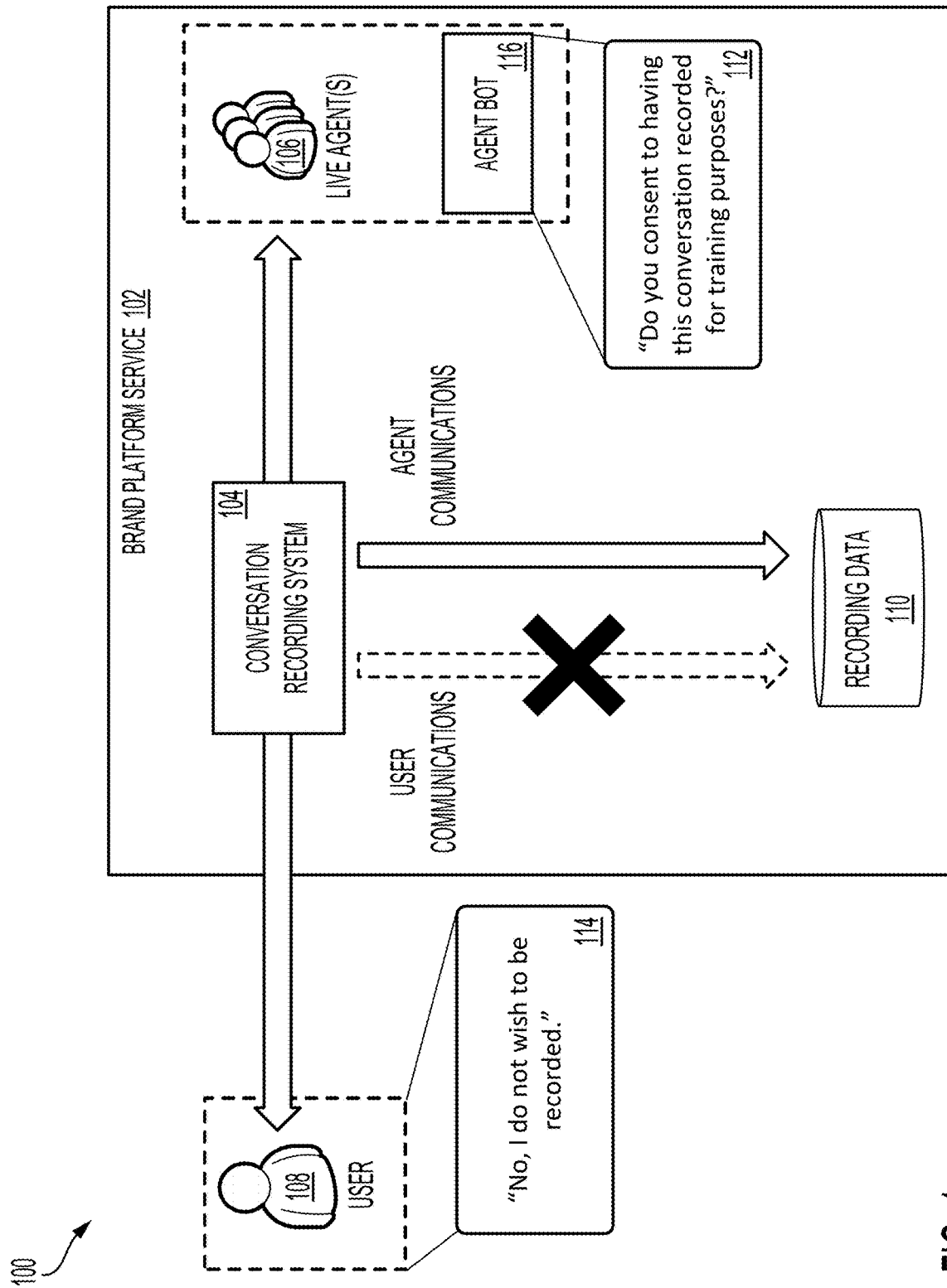
FIG. 1 shows an illustrative example of an environment in which a conversation recording system generates recording data associated with a communications session between a user and an agent according to a specified recording restriction communicated by the user in accordance with at least one embodiment.

FIG. 1 shows an illustrative example of an environment 100 in which a conversation recording system 104 generates recording data associated with a communications session between a user 108 and an agent 106 according to a specified recording restriction communicated by the user 108 in accordance with at least one embodiment. In the environment 100, a brand platform service 102 facilitates a communications session between a user 108 and an agent 106 affiliated with the brand platform service 102. The brand platform service 102 may be an entity that provides, operates, or runs a service for providing assistance to users associated with a brand or other organization that provides services and/or goods to its users, such as user 108. For instance, the brand platform service 102 may provide user support on behalf of the brand or other organization. In some embodiments, the brand platform service 102 is provided by the brand or other organization to process requests and/or issues submitted by users associated with the brand.

In an embodiment, the brand platform service 102 implements a conversation recording system 104 to automatically, and in real-time, record communications exchanged between users (such as user 108) and agents 106 as these communications are exchanged. The conversation recording system 104 may be implemented on a computer system or other system (e.g., server, virtual machine instance, etc.) of the brand platform service 102. Alternatively, the conversation recording system 104 may be implemented as an application or other process executed on a computing system of the brand platform service 102.

In an embodiment, the conversation recording system 104 automatically, and in real-time, can transcribe communications between users (such as user 108) and agents 106 as these communications are exchanged subject to any applicable recording restrictions. For instance, the conversation recording system 104 may be implemented using automated speech recognition (ASR), which may allow the conversation recording system 104 to automatically, and in real-time, generate transcripts corresponding to any communications exchanged between users and agents 106 subject to any applicable recording restrictions. For instance, in an embodiment, the conversation recording system 104, through real-time ASR, can automatically transcribe, in real-time, a newly exchanged communication between the user 108 and an agent (e.g., a live agent 106, an agent bot 116, etc.) when this newly exchanged communication is received (e.g., exchanged over the communications session). For example, if the user 108 communications, over the communications session, a message indicating the issue that the user 108 would like to have resolved, the conversation recording system 104 may automatically transcribe this message in real-time using real-time ASR to generate a transcription of the message.

Transcriptions of exchanged communications may be generated without creating a temporary or persistent audial recording of the exchanged communications. For instance, the conversation recording system 104 may stream the communications session between the user 108 through a transcription sub-system (as described in greater detail herein), which may automatically and in real-time, transcribe any communications exchanged over the communications session as these communications are exchanged. In some instances, the conversation recording system 104 may stream the communications session through both a communication processing sub-system and a transcription sub-system (as described in greater detail herein) simultaneously and in real-time. The communication processing sub-system may automatically record the exchanged communications, subject to any applicable recording restrictions, to generate a persistent audial or other recording of the communications session. Meanwhile, the transcription sub-system may automatically, and in real-time, process any exchanged communications as these communications are received to generate transcriptions of these exchanged communications. These transcriptions may be processed in real-time to generate a set of performance metrics for the agent(s) engaged in the communications session and to provide conversation analytics that may be used to determine one or more characteristics of the user 108 (e.g., intents/issues associated with the user 108, user preferences, user sentiments, user behaviors, etc.). Alternatively, these transcriptions may be compiled in real-time into a single transcription of the communications session. Once the communications session has concluded, the transcription of the communications session may be processed to generate a set of performance metrics for the agent(s) that were engaged in the communications session and to provide complete conversation analytics for determining the one or more characteristics of the user 108.

In some jurisdictions, an affirmative consent to record the user 108 is required before the conversation recording system 104 can record any communications exchanged by the user 108 to an agent 106 associated with the brand platform service 102. In these jurisdictions, the brand platform service 102 may be required to obtain the user's affirmative consent to being recorded prior to the conversation recording system 104 being able to record communications exchanged by the user 108 through a communications session between the user 108 and an agent 106. For instance, if the user 108 is not prompted to provide their consent with regard to the recording of their communications over an active communications session with an agent 106, the conversation recording system 104 (based on a default recording restriction associated with the user 108) may not be authorized to record the communications exchanged by the user 108 during the communications session between the user 108 and an agent 106.

In an embodiment, the conversation recording system 104 determines that an affirmative consent to record the user 108 is required based on a known geographical location of the user 108. For instance, when the user 108 transmits a request to the brand platform service 102 to initiate a communications session with an agent 106 in order to address an intent or issue, the conversation recording system 104 may prompt the user 108 to indicate their present geographic location (e.g., city, state, country, zip code, area code, physical address, etc.). Based on the user's response to this prompt, the conversation recording system 104 may automatically determine whether the indicated geographic location corresponds to one or more recording restrictions whereby affirmative consent from the user 108 is required in order to record any communications expressed by the user 108 during a communications session with an agent 106. For example, the conversation recording system 104 may query a database or other repository corresponding to geographic locations where user consent is required for creating and storing user recordings corresponding to user communications exchanged during a communications session to determine whether an indicated location associated with the user 108 corresponds to any of the geographic locations indicated in the database or other repository. If so, the conversation recording system 104 may determine that the user's affirmative consent to being recorded during the communications session is required.

In an embodiment, the conversation recording system 104 automatically determines the geographic location associated with the user 108 based on Internet Protocol (IP) or Media Access Control (MAC) geolocation. For instance, if the user 108 accesses the brand platform service 102 through a communications network (e.g., Wide-Area Network (WAN), Local-Area Network (LAN), a cellular network, a Wi-Fi network, a satellite network, or any other such network or combination of networks, etc.), the conversation recording system 104 may automatically determine the IP and/or MAC address associated with the computing device utilized by the user 108 to access the brand platform service 102. Based on the IP and/or MAC address, the conversation recording system 104 may automatically determine an approximate geographical location of the user 108. Based on this approximate geographical location, the conversation recording system 104 may query the aforementioned database or other repository corresponding to geographic locations where user consent is required for creating and storing user recordings corresponding to user communications exchanged during a communications session to determine whether the approximate geographic location corresponds to any of the geographic locations indicated in the database or other repository.

If the conversation recording system 104 determines, based on the geographic location associated with the user 108, that affirmative consent is not required in order to record user communications exchanged during a communications session with an agent 106, the conversation recording system 104 may facilitate the communications session between the user 108 and an agent 106 and record, in real-time, the communications exchanged between the user 108 and the agent 106 as these communications are exchanged. In an embodiment, the conversation recording system 104 generates, in real-time, a transcript of the communications session between the user 108 and the agent 106 as communications are exchanged over the communications session. For instance, the conversation recording system 104 may dynamically train and implement a machine learning algorithm or artificial intelligence that may automatically, and in real-time, process communications exchanged between the user 108 and the agent 106 as these communications are exchanged over the communications session to generate a textual transcript of the communications session.

In an embodiment, the machine learning algorithm or artificial intelligence implemented by the conversation recording system 104 is dynamically trained using supervised learning techniques. For instance, a dataset of recorded communications sessions between users and agents (e.g., live agents 106, agent bots 116, etc.) and known transcripts associated with these recorded communications sessions (e.g., manually created transcripts, automatically created transcripts with annotations, etc.) can be selected for training of the machine learning algorithm or artificial intelligence. In some embodiments, the known transcripts used to train the machine learning algorithm or artificial intelligence may include characteristics of these transcripts (e.g., identification of the user in a communications session, identification of an agent in a communications session, intents expressed during the communications session, user and/or agent sentiment during the communications session, etc.). The machine learning algorithm or artificial intelligence may be evaluated to determine, based on the input sample communications sessions supplied to the machine learning algorithm or artificial intelligence, whether the machine learning algorithm or artificial intelligence is generating accurate transcriptions of these communications sessions (e.g., correctly identifying the user and agent engaged in the communications session, accurately converting audial communications to text, etc.) based on the communications exchanged between users and agents in these sample communications sessions. Based on this evaluation, the machine learning algorithm or artificial intelligence may be modified to increase the likelihood of the machine learning algorithm or artificial intelligence generating the desired results (e.g., accurate transcripts for different communications sessions, etc.). The machine learning algorithm or artificial intelligence may further be dynamically trained by soliciting feedback with regard to the transcription of their communications sessions. For instance, an administrator of the brand platform service 102 may review the audial recording of the communications session and the corresponding transcript generated by the machine learning algorithm or artificial intelligence to identify any inaccuracies in the provided transcript. Annotations made by this administrator to the transcript addressing any identified inaccuracies may be supplied to further train the machine learning algorithm or artificial intelligence.

In an embodiment, the machine learning algorithm or artificial intelligence utilized by the conversation recording system 104 can include one or more natural language processing (NLP) algorithms that may automatically convert audial communications exchanged between users and agents 106 in real-time as these audial communications are exchanged into text that may be included in corresponding transcripts of these communications sessions. As used herein, NLP is a mechanism whereby computational systems such as those described herein may be used to process and analyze language (from text and audio sources) that is natural (i.e., unstructured). In such systems, the result of the analysis may enable the NLP algorithms to generate insights (i.e., information) about the contents of the source communications and, by extension, about other communications that are in the same language. In such systems, the result of the analysis may enable the NLP algorithms to categorize and/or provide metadata about the source communications and/or about other communications. Being able to both understand and categorize natural language enables a system (e.g., the conversation recording system 104, etc.) to generate better and/or more accurate insights from natural language and may provide a basis for a system that can receive natural language, understand it, and respond in a reasonable manner. As the NLP algorithms process and analyze a larger set of natural language sources (e.g., communications sessions and corresponding communications, etc.), the quality of the understanding and interaction may improve. Examples of NLP algorithms include, but are not limited to, rule-based NLP (also referred to as "symbolic" NLP and based on sets of applied rules), statistical NLP (generally implemented with unsupervised and/or semi-supervised statistical analyses of unstructured data), and Neural NLP (based on representation learning and deep-learning artificial intelligence techniques). As may be contemplated, when analyzing text sources for NLP, systems can directly input the text into the analysis system while analyzing audio sources may involve first performing speech recognition on the audio source to extract the words and then those words can be input into the analysis system.

In an embodiment, if the conversation recording system 104 determines that affirmative consent is required from the user 108 in order to record the user's communications exchanged over the communications session with an agent 106, the conversation recording system 104 can activate an agent bot 116 that is implemented to solicit authorization from the user 108 for recording the user's communications. An agent bot 116 may be an automated process that is implemented or dynamically trained to communicate with users through communications sessions facilitated by the brand platform service 102 in order to solicit user authorization for recording of user communications during these communications sessions. For instance, if the conversation recording system 104 determines that affirmative consent is required from the user 108 in order to record the user's communications exchanged over the communications session, prior to allowing the user 108 to engage with the agent 106, the agent bot 116 may solicit the user 108 to provide their authorization for recording user communications exchanged over the communications session. As an illustrative example, through the communications session, the agent bot 116 may state "do you consent to having this conversation recorded for training purposes?" In response to this statement, the user 108 may provide their affirmative response or rejection to the solicitation.

In some instances, the agent bot 116 is implemented using NLP, interactive voice recognition systems, and other forms of conversational voice algorithms and systems. This may allow the agent bot 116 to communicate with the user 108 through the communications session. For example, if the communications session is implemented through one or more audial communication methods (e.g., telephony, Voice over Internet Protocol (VOIP), etc.), the agent bot 116 may automatically transmit an audial message 112 to the user 108 to solicit the user's authorization for recording of user communications during the communications session. For instance, as illustrated in FIG. 1, the agent bot 116 has communicated the message 112 "Do you consent to having this conversation recorded for training purposes?".

In an embodiment, once the agent bot 116 has communicated the message 112 to the user 108 to request the user's authorization for recording user communications, the conversation recording system 104, using the aforementioned machine learning algorithm or artificial intelligence, can automatically, and in real-time, process any subsequent user communications to determine whether the user 108 has provided their affirmative consent to being recorded during the communications session. For example, as illustrated in FIG. 1, the user 108, through a user message 114, has indicated that they do not wish to be recorded (e.g., "No, I do not wish to be recorded."). The conversation recording system 104, using the aforementioned machine learning algorithm or artificial intelligence, may automatically process, in real-time, the user message 114 to determine that the user 108 has indicated that they do not wish to be recorded. Accordingly, for the communications session associated with the user 108, the conversation recording system 104 may forego recording of user communications. Alternatively, if the user 108 indicates, in response to the message 112, that the user 108 affirmatively consents to being recorded (e.g., "Yes, I am fine with being recorded," etc.), the conversation recording system 104 may automatically record all communications exchanged between the user 108 and the agent 106 in real-time as these communications are exchanged.

In an embodiment, once the user 108 has provided their response to the solicitation for consent communicated by the agent bot 116, the agent bot 116 transfers the communications session to a live agent 106 that may assist the user 108 with the intent or issue that the user 108 wishes to have addressed. For instance, in response to the user's request to address a particular intent or issue, the brand platform service 102 may evaluate the request to extract an intent expressed by the user 108 and that may be used to identify a live agent 106 that may be able to address the intent or issue expressed by the user 108. In an embodiment, the brand platform service 102 implements a machine learning algorithm or artificial intelligence to process the request in order to identify and extract the intent from the request. The machine learning algorithm or artificial intelligence may be implemented to perform a semantic analysis of the request (e.g., by identifying keywords, sentence structures, repeated words, punctuation characters and/or non-article words) to identify the intent expressed in the request. The machine learning algorithm or artificial intelligence implemented by the brand platform service 102 to automatically identify the intent or issue that is to be addressed may be dynamically trained using supervised learning techniques. For instance, a dataset of input requests and known intents included in the input requests can be selected for training of the machine learning algorithm or artificial intelligence. In some implementations, known intents used to train the machine learning algorithm or artificial intelligence may include characteristics of these intents. The machine learning algorithm or artificial intelligence may be evaluated to determine, based on the input sample requests supplied to the machine learning algorithm or artificial intelligence, whether the machine learning algorithm or artificial intelligence is extracting the expected intents from each of the requests. Based on this evaluation, the machine learning algorithm or artificial intelligence may be modified to increase the likelihood of the machine learning algorithm or artificial intelligence generating the desired results. The machine learning algorithm or artificial intelligence may further be dynamically trained by soliciting feedback from users, including user 108, with regard to the extracted intent obtained from submitted requests. For instance, prior to submitting an extracted intent for identification of a live agent 106 that may address the expressed intent or issue, the extracted intent may be presented to the user 108 to determine whether the extracted intent corresponds to the request submitted by the user 108. The response from the user 108 may, thus, be utilized to train the machine learning algorithm or artificial intelligence based on the accuracy of the machine learning algorithm or artificial intelligence in identifying the intent from the request.

An intent may correspond to an issue that a customer wishes to have resolved. Examples of intents can include (for example) topic, sentiment, complexity, and urgency. A topic can include, but is not limited to, a subject, a product, a service, a technical issue, a use question, a complaint, a refund request or a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

The extracted intent may be used by the brand platform service 102 to identify a live agent 106 that may be able to address the expressed intent or other issue expressed by the user 108. For instance, a particular live agent 106 may be selected based on one or more factors such as, for example, an extent to which the agent's knowledge base corresponds to the expressed intent or other issue expressed by the user 108, the agent's availability, the agent's location in relation to the location of the user 108 and the like. In some instances, the brand platform service 102 may evaluate a set of agent profiles corresponding to the set of live agents 106 to select a particular agent profile according to a correlation of the agent profile to the identified intent or issue. The correlation of the agent profile to the intent or issue may indicate that the intent or issue matches, or is closest to, an intent of which the agent 106 is knowledgeable or has experience, for example. In some instances, the brand platform service 102 may automatically identify the first available live agent 106 for the communications session (e.g., all agents 106 are capable of handling the particular intent or issue, etc.).

In an embodiment, once the communications session has been established between the user 108 and the live agent 106, the conversation recording system 104 records the communications session according to any applicable recording restrictions (e.g., based on a user response to the solicitation for recording authorization, based on geographic location of the user 108, based on existing regulations or other privacy restrictions, etc.). For example, if there are no applicable recording restrictions (e.g., the user 108 has provided their affirmative consent to being recorded during the communications session, etc.), the conversation recording system 104 may record all communications exchanged between the user 108 and the live agent 106 in real-time as these communications are exchanged. The recording of this communications session may be stored in a recording datastore 110. The recording datastore 110 may be repository or database that maintains entries corresponding to different communications sessions facilitated by the brand platform service 102. For instance, an entry within the recording datastore 110 may include a unique identifier corresponding to a particular communications session, identification information corresponding to the user and live agent(s) involved in the communications session, any applicable recording restrictions associated with the communications session, any indications of affirmative consent provided by the user associated with the communications session, and the recording of the communications session.

In an embodiment, if the user 108 has not provided their affirmative consent to being recorded during the communications session or there are other recording restrictions applicable for the communications session (e.g., existing regulations or other privacy restrictions, etc.), the conversation recording system 104 can automatically record agent communications exchanged during the communications session while automatically omitting any user communications from the recording. For example, if the communications session is facilitated through separate communications channels for the user 108 and the live agent 106 (e.g., a first channel for the user 108 and a second channel for the live agent 106), the conversation recording system 104 may automatically identify and record the communications channel associated with the live agent 106 while omitting the communications channel associated with the user 108. Thus, the recording of the communications session may only include the communications exchanged by the live agent 106 during the communications session as these communications are exchanged.

In an embodiment, if the communications session is facilitated through a single communications channel (e.g., the user 108 and the live agent 106 share a communications channel during the communications session), the conversation recording system 104 may process the communications exchanged between the user 108 and the agent bot 116 in real-time as these communications are exchanged to identify any communications expressed by the user 108. For instance, using the aforementioned machine learning algorithm or artificial intelligence, the conversation recording system 104 may automatically identify user communications during the communications session and omit these communications from the recording of the communications session. For example, rather than recording the user communications, the conversation recording system 104 may insert an audial null, void, other signal in the recording to replace the user communications.

In some instances, to identify the user communications expressed during the communications session, the agent bot 116 may process the audial communication provided by the user 108 in response to the agent bot's solicitation for affirmative consent to determine a voice signature associated with the user 108. The voice signature may correspond to different characteristics associated with the user's voice that may be used to uniquely identify the user 108 based on their audial communications. As each user 108 may have a unique voice signature, the agent bot 116 may be able to associate the user 108 with the identified voice signature determined through processing of the user's response to the solicitation for affirmative consent. This unique voice signature may be used by the conversation recording system 104 (through the machine learning algorithm or artificial intelligence) to automatically identify user communications exchanged through the communications session.

In an embodiment, the conversation recording system 104 can automatically process the audial communications exchanged during the communications session in real-time to determine unique voice signatures associated with the user 108 and the live agent 106. For instance, for each newly received communication, the conversation recording system 104 may automatically process the communication to generate a voice signature corresponding to the communication. Further, using the machine learning algorithm or artificial intelligence described above for analyzing exchanged communications, the conversation recording system 104 may determine the purpose of the communication and determine whether it corresponds to the user 108 or the agent bot 116.

For example, if a received communication states "I need help with fixing my washer," the conversation recording system 104 may determine that such a communication is likely associated with a user rather than an agent. As another example, if a received communication states "I will need your billing information in order to process your request," the conversation recording system 104 may determine that such a communication is likely associated with an agent rather than a user.

In some instances, the conversation recording system 104, through the aforementioned machine learning algorithm or artificial intelligence, may detect one or more anchor terms or phrases that may particularly correspond to users or agents engaged in a communications session. For example, returning to the received communication that states "I need help with fixing my washer," the conversation recording system 104 may process this communication in real-time using the machine learning algorithm or artificial intelligence to detect the anchor phrase "need help." This anchor phrase may be processed using a machine learning data analysis algorithm to determine that the anchor phrase likely corresponds to a user rather than an agent. This machine learning data analysis algorithm may be trained using sample or live data to identify potential correlations between different anchor terms/phrases and different entities (e.g., users, agents, etc.). Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Accordingly, the machine learning data analysis algorithm may return an output that indicates that the communication "I need help with fixing my washer" corresponds to a user.

In an embodiment, the conversation recording system 104 maintains, within the recording datastore 110, voice signatures for each of the live agents 106 associated with the brand platform service 102. For instance, during an onboarding process, each live agent 106 may be recorded (such as through responses to onboarding questions, etc.) to calculate a voice signature for the live agent 106 that may be made available through the recording datastore 110. When a new communications session is established between the user 108 and a live agent 106, the conversation recording system 104 may automatically retrieve, from the recording datastore 110, the voice signature associated with the live agent 106. Using this voice signature, the conversation recording system 104 may automatically discern any user communications exchanged during the communications session, as these user communications may have a different voice signature compared to the known voice signature associated with the live agent 106. Thus, in real-time, the conversation recording system 104 can identify the user communications based on these user communications not corresponding to the known voice signature of the live agent 106.

In an embodiment, if the communications session was established with the user's affirmative consent to being recorded during the communications session, the conversation recording system 104 continues to monitor user communications, in real-time, as these user communications are exchanged to determine whether the user 108 has revoked their consent to being recorded. For example, during the communications session, the conversation recording system 104 (through the aforementioned machine learning algorithm or artificial intelligence) may automatically process each user communication in real-time as it is exchanged to automatically detect any anchor terms or phrases that may correspond with a request to cease recording of user communications. For example, if the user 108 utters, in a user communication, "Could you stop recording me?", the conversation recording system 104 may identify the anchor phrase "stop recording" from the user communication. Based on the "stop recording" anchor phrase, the conversation recording system 104 may automatically determine that the user 108 has revoked their consent to being recorded during the communications session.

If the user 108 revokes their previously provided consent to being recorded during the communications session, the conversation recording system 104 may cease recording of user communications during the communications session. The conversation recording system 104 may continue to record agent communications exchanged during the communications session while automatically omitting any subsequent user communications from the recording. In an embodiment, if the user 108 revokes their previously provided consent during the communications session, the conversation recording system 104 automatically, and in real-time, removes any user communications previously recorded during the communications session prior to the user's revocation of their consent. For instance, the conversation recording system 104, in response to the user's revocation of their previously provided consent to being recorded during the communications session, may access the recording datastore 110 to identify any user communications included in the present recording of the communications session between the user 108 and the live agent 106. For example, if the communications session is facilitated through separate communications channels for the user 108 and the live agent 106, the conversation recording system 104 may automatically identify the communications channel associated with the user 108 and automatically discard any communications corresponding to this communications channel from the recording.

If the communications session is facilitated through a single communications channel, the conversation recording system 104, through the aforementioned machine learning algorithm or artificial intelligence, may process the previously recorded communications to detect any anchor terms or phrases that may particularly correspond to the user 108 in the communications session. Any communications that include anchor terms or phrases that particularly correspond to users as opposed to agents may be automatically discarded from the recording. In an embodiment, the conversation recording system 104 can use the aforementioned voice signatures corresponding to the user 108 and the live agent 106 to automatically detect the previously recorded user communications from the recording. For instance, using the voice signature corresponding to the user 108, the conversation recording system 104 may identify, from the recording, any communications corresponding to the user 108. Once identified, the conversation recording system 104 may automatically discard any previously recorded user communications from the recording.

In an embodiment, the brand platform service 102 can generate and provide various analytics corresponding to agent performance regardless of whether recordings include user communications or not. For instance, the brand platform service 102 may implement a machine learning algorithm or artificial intelligence that is dynamically trained to process, in real-time, recordings corresponding to communications sessions between users and agents as communications are exchanged during these communications sessions to generate a set of agent performance metrics. This machine learning algorithm or artificial intelligence may be trained using supervised training techniques. For instance, the machine learning algorithm or artificial intelligence may be trained using sample recordings corresponding to communications sessions between users (e.g., actual users, entities acting as users for creation of sample recordings, etc.) and agents (e.g., actual agents, entities acting as agents for creation of sample recordings, etc.) and corresponding feedback provided with regard to performance metrics generated by the machine learning algorithm or artificial intelligence based on the sample recordings. As an illustrative example, an evaluator of the machine learning algorithm or artificial intelligence (e.g., an administrator of the brand platform service 102, agents associated with the brand platform service 102, independent party introduced to perform such evaluations, etc.) may review the generated performance metrics and the corresponding sample communications session recording to determine whether the provided performance metrics are accurate and correspond to the agent's actual performance during the sample communications session. Based on this feedback, the machine learning algorithm or artificial intelligence may be re-trained to provide more accurate or improved performance metrics to agents based on their performance during communications sessions with users.

The performance metrics corresponding to an agent may be generated based on various criteria. For example, the brand platform service 102 may generate a set of performance metrics associated with the effort required to address a user's intent or issue during a communications session. For instance, based on the performance of the agent 106 in addressing a user's intent or issue, the brand performance service 102 may determine the amount of effort required by the agent 106 to address the user's particular intent or issue and calculate one or more metrics corresponding to this amount of effort. As an illustrative example, if a user 108 required repeated communications with the agent 106 to address their issue or experienced significant wait times to have their issue addressed, the brand performance service 102 may assign a score corresponding to a high amount of effort required to address user's particular intent or issue. For instance, the brand performance service 102 may assign a high score that corresponds to a high amount of effort required, whereas a low score may correspond to a low amount of effort required by the agent 106 to address the user's particular intent or issue.

Another illustrative example of a performance metric that may be determined for the agent 106 based on the communications session between the agent 106 and the user 108 is a performance metric that is determined based on the level of emotion associated with the user 108 during the communications session. For instance, if the communications session is related to a cancellation or billing dispute, which can have a high propensity to be emotionally changed and, in turn, lead to a higher number of complaints or escalation, the brand platform service 102 may calculate an emotion score corresponding to a negative emotional load for the user 108. Alternatively, if the communications session is resolved positively, whereby the user 108 comes away pleased with the resolution (as determined through their communications exchanged during the communications session or through subsequent feedback), the brand platform service 102 may calculate an emotion score corresponding to a positive emotional load for the user 108.

The brand platform service 102 may further determine the level of efficiency of the agent 108 in handling the user's particular intent or issue during the communications session to calculate an efficiency score for the agent 106. The brand platform service 102, for example, may determine the length of time required for the agent 106 to respond to user communications exchanged during the communications session. For instance, if the agent 106 requires a significant amount of time to respond to a user 108 (e.g., 30 seconds, a minute, etc.) or if there is a significant pause in the communications session, the brand platform service 102 may assign an efficiency score corresponding to a low level of efficiency for the agent 106. Alternatively, if the agent 106 is responsive to user communications (e.g., the agent 106 immediately responds to user communications, the agent 106 remains engaged in the communications session while researching resolutions to the expressed intent or issue, etc.), the brand platform service 102 may assign an efficiency score corresponding to a higher level of efficiency for the agent 106.

The brand platform service 102, in some instances, may further generate performance metrics corresponding to the agent's level of effectiveness in addressing the user's particular intent or issue during the communications session. For example, if the brand platform service 102 determines, based on the recording of the communications session between the agent 106 and the user 108 that the agent 106 is not leveraging available tools for resolving the user's particular intent or issue, the brand platform service 102 may assign an effectiveness score corresponding to a low level of effectiveness for the agent 106. Similarly, if the brand platform service 102 determines that the agent 106 is communicating with the user 108 at a rapid rate while leaving little to no time for the engineering of solutions to the user's particular intent or issue, the brand platform service 102 may assign an effectiveness score corresponding to a low level of effectiveness for the agent 106.

In an embodiment, the machine learning algorithm or artificial intelligence is further dynamically trained to identify and/or infer any implied elements corresponding to user communications from any recorded agent communications in the event that a recording does not include any user communications (e.g., the user 108 has not provided their affirmative consent to being recorded, the user 108 has revoked their consent during the communications session, etc.). For example, the machine learning algorithm or artificial intelligence may be dynamically trained using a dataset that includes sample recordings that include, for each sample communications session, a recording that includes both user and agent communications and a recording that only includes agent communications. The dataset may further indicate, for each recording pairing, the expected elements corresponding to the user communications that are to be determined from evaluation of corresponding agent communications. For example, if a user expresses, in a sample recording, "I have had it with this garbage microwave" and the agent responds with "I am sorry that you are having issues with your microwave. How may I be of assistance?," the machine learning algorithm or artificial intelligence may be dynamically trained to determine, from the agent's communication, the user's intent (e.g., assistance with regard to a microwave) and sentiment (e.g., agitated, upset, etc.). The complete sample recording including both the user and agent communications may serve as the ground truth for the determination of the user's intent and sentiment such that this complete sample recording may be used to determine whether the machine learning algorithm or artificial intelligence is accurately inferring the user's intent and sentiment based on the agent's communications. Accordingly, based on this determination, the machine learning algorithm or artificial intelligence may be dynamically re-trained to improve the accuracy of the machine learning algorithm or artificial intelligence in determining the user's intent and sentiment, as well as the agent's performance during the communications session.

In an embodiment, the machine learning algorithm or artificial intelligence implemented by the brand platform service 102 is dynamically updated in real-time as messages are exchanged between users and agents during their respective communications sessions. For instance, as the brand platform service 102 processes communications recorded during a communications session between a user 108 and an agent 106 (regardless of whether the recording includes the complete communications session or just the agent communications), the machine learning algorithm or artificial intelligence may be dynamically updated based on the accuracy of the generated performance metrics associated with the agent 106 (as determined based on independent evaluation of the communications session, user feedback, etc.). Further, as additional communications are obtained and processed, the performance metrics associated with the agent 106 may be dynamically updated such that the accuracy of the machine learning algorithm or artificial intelligence may be continuously evaluated and improved upon through re-training of the machine learning algorithm or artificial intelligence. Further, the machine learning algorithm or artificial intelligence may be implemented to simultaneously process communications corresponding to different, contemporaneous communications sessions between users and agents, using recordings corresponding to these communications sessions to dynamically, and in real-time, produce performance metrics for the different agents engaged in these communications sessions.

In addition to providing performance metrics with regard to an agent's performance during a communications session, the brand platform service 102 may further evaluate agent responses during the communications session to determine whether the agent 106 has performed any required tasks. For example, the brand platform service 102, through the machine learning algorithm or artificial intelligence, may automatically process agent communications during a communications session (regardless of whether user communications are recorded or not) to determine whether the agent 106 has read any applicable terms and conditions, has presented any applicable disclaimers, did not make any inappropriate comments or unauthorized representations, disclosed any applicable pricing details (if relevant to the communications session), and the like.

In an embodiment, the brand platform service 102 can further provide one or more recommendations for how to improve the performance of the agent 106 based on their performance during the communications session with the user 108. As an illustrative example, if the brand platform service 102 determines, based on user communications or inferences made from agent communications during the communications session (if user communications were not recorded), that the agent 106 took too long to respond to the user 108 with regard to their particular intent or issue and was unable to identify the user's particular intent or issue in a timely manner, the brand platform service 102 may recommend remedial training for the agent 106 to better identify similar intents or issues using automated tools or other available resources. If such automated tools are already implemented, and the agent 106 has not used these tools effectively (as evidenced through the communications exchanged during the communications session), the brand platform service 102 may recommend that the agent 106 be trained on how to utilize these tools effectively.

Figure 2:
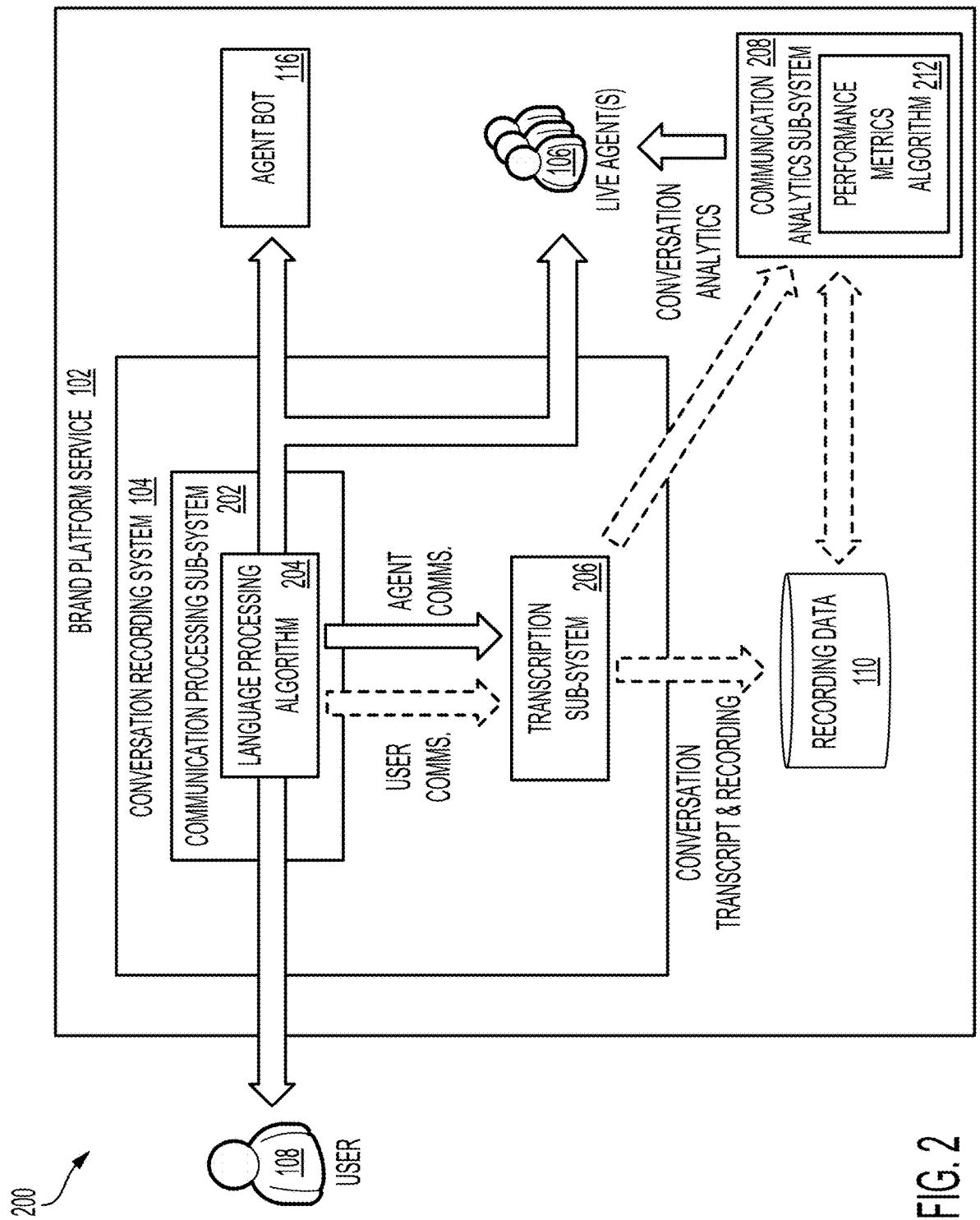
FIG. 2 shows an illustrative example of an environment in which communications between a user and one or more agents are recorded according to any specified recording restrictions in order to generate conversation analytics corresponding to agent performance in accordance with at least one embodiment.

FIG. 2 shows an illustrative example of an environment 200 in which communications between a user 108 and one or more agents (e.g., one or more live agents 106, an agent bot 116, etc.) are recorded according to any specified recording restrictions in order to generate conversation analytics corresponding to agent performance in accordance with at least one embodiment. In the environment 200, a user 108 may submit a request to a brand platform service 102 to initiate a communications session for addressing a particular intent or issue. For instance, the user 108 may access the brand platform service 102 to address an issue related to an appliance manufactured by a particular brand associated with the brand platform service 102. As another example, the user 108 may access the brand platform service 102 to provide payment for an outstanding balance associated with their account.

As noted above, the brand platform service 102 implements a conversation recording system 104 that automatically, and in real-time, records communications between users and agents (e.g., one or more live agents 106, an agent bot 116, etc.) as communications are exchanged amongst these users and agents subject to any applicable recording restrictions. These recordings may be used for various purposes. For instance, a recording of a communications session between a particular user and one or more agents may be used to determine whether these one or more agents have read any applicable terms and conditions, have presented any applicable disclaimers, did not make any inappropriate comments or unauthorized representations, disclosed any applicable pricing details (if relevant to the communications session), and the like. Further, as described in greater detail herein, these recordings may be reviewed to generate a set of performance metrics that may be used to gauge an agent's performance in addressing a user's particular intent or issue during the corresponding communications session. The set of performance metrics may be further used to identify any remedial actions or training that may be performed to improve the performance of these agents in addressing any identified intents or issues expressed by users during these communications sessions.

In an embodiment, the conversation recording system 104 can automatically, and in real-time, generate transcriptions of communications exchanged between users and agents as these communications are exchanged using real-time ASR without recording or other persistently storing any of these communications. For instance, when either a user 108 or an agent (e.g., an agent bot 116, a live agent 106, etc.) exchanges a communication over the communications session, the conversation recording system 104 may automatically transcribe the communication in real-time when the communication is received (such as through a live data stream associated with the communications session) to generate a transcription of the communication. This transcription of the communication may be automatically, and in real-time, provided to a communication analytics sub-system 208 (as described in greater detail herein) to generate or otherwise update a set of performance metrics for the one or more agents engaged in the communications session. Further, the communication analytics sub-system 208 may dynamically generate or otherwise update a set of user characteristics that may be used to identify possible recommendations for better communicating with the user 108 and for better addressing any identified issues or intents. In some instances, the conversation recording system 104 may automatically compile the transcriptions of the various communications exchanged over the communications session to generate a complete transcription of the communications session. Once the communications session has concluded, the conversation recording system 104 may automatically provide the complete transcription of the communications session to the communication analytics sub-system 208 to generate or otherwise update the aforementioned set of performance metrics and user characteristics.

In an embodiment, in response to the user request to communicate with an agent in order to address a particular intent or issue, the conversation recording system 104 determines whether an affirmative consent from the user 108 is required in order for user communications to be recorded. As noted above, in some jurisdictions, an affirmative consent to record the user 108 is required before the conversation recording system 104 can record any communications exchanged by the user 108. In these jurisdictions, the brand platform service 102 may be required to obtain the user's affirmative consent to being recorded prior to the conversation recording system 104 being able to record communications exchanged by the user 108 through a communications session. If the user's affirmative consent cannot be obtained, the conversation recording system 104 (based on a default recording restriction associated with the user 108) may not be authorized to record any user communications exchanged by the user 108. In some instances, the conversation recording system 104 may, by default, require the user's affirmative consent prior to recording any user communications, regardless of whether such consent is required based on jurisdiction, regulation, and the like.

In some instances, to determine whether the user's affirmative consent is required for recording any user communications, the conversation recording system 104 may prompt the user 108 to indicate their present geographic location (e.g., city, state, country, zip code, area code, physical address, etc.). Based on the user's response to this prompt, the conversation recording system 104 may automatically determine whether the indicated geographic location corresponds to one or more recording restrictions whereby affirmative consent from the user 108 is required for recording any user communications. The conversation recording system 104, based on the response to this prompt, may query a database or other repository corresponding to geographic locations where user consent is required for creating and storing recordings of user communications to determine whether the user's indicated location corresponds to any of the geographic locations indicated in the database or other repository. If so, the conversation recording system 104 may determine that the user's affirmative consent to being recorded is required. As noted above, the conversation recording system 104 may automatically determine the user's geographic location based on IP or MAC geolocation.

In an embodiment, if the conversation recording system 104 determines that the user's affirmative consent is required in order to record any user communications, the conversation recording system 104 executes an agent bot 116 that may solicit the user 108 for their affirmative consent to being recorded. As noted above, the agent bot 116 may be an automated process that is implemented or dynamically trained to communicate with users through communications sessions facilitated by the brand platform service 102 in order to solicit user authorization for recording of user communications exchanged during these communications sessions. In some instances, the agent bot 116 may be executed through a communication processing sub-system 202 associated with the conversation recording system 104. The communication processing sub-system 202 may be implemented as a computer system or application implemented by the conversation recording system 104 to automatically, and in real-time, establish communications sessions between users and agents associated with the brand platform service 102 (e.g., the agent bot 116, live agents 106, etc.). In an embodiment, the agent bot 116 is executed when the communications session for the user 108 is established, such that the user's first point of contact through the communications session is with the agent bot 116.

In some instances, prior to prompting the user 108 for their affirmative consent to being recording during the communications session, the communication processing sub-system 202 may establish the communications session between the user 108 and a live agent 106 for addressing the particular intent or issue that the user 108 wishes to have resolved. However, prior to being able to communicate with the user 108 through this communications session, the live agent 106 may be prevented from communicating with the user 108 through the communications session until a determination is made regarding the user's authorization to being recorded during the communications session. In an embodiment, through this communications session, the communication processing sub-system 202 can execute the agent bot 116, which may prompt the user 108 to provide their affirmative consent to being recorded during the communications session. The execution of the agent bot 116 may be performed while the live agent 106 is a participant in the communications session. This may allow the live agent 106 to monitor the communications session as the agent bot 116 automatically communicates with the user 108.

In an embodiment, the communications session between the user 108 and the agent bot 116 is displayed at a terminal device associated with an assigned live agent 106 to allow the live agent 106 to intervene in the communications session if needed. The live agent 106 may decide to intervene in the communications session (or the communications session may be automatically transferred to the live agent 106) based on a calculated sentiment score of the user's satisfaction with the communications session. For example, a threshold may exist for which the sentiment score should be above if the user 108 is satisfied with the communications session. If the sentiment score is below a threshold, the communications session may be manually or automatically transferred to the live agent 106. The sentiment score may be calculated by a language processing algorithm 204 implemented by the communication processing sub-system 202. The language processing algorithm 204 may be configured to automatically process communications exchanged during the communications session as input to generate the sentiment score. The language processing algorithm 204 may be trained using supervised learning techniques. For instance, a dataset of input communications and corresponding sentiments and sentiment scores can be selected for training of the language processing algorithm 204. In some examples, the input communications can be obtained from administrators of the brand platform service 102, users, agents (e.g., live agents 106, other agents, etc.), and other sources. The language processing algorithm 204 may be evaluated to determine, based on the input communications supplied to the language processing algorithm 204, whether the language processing algorithm 204 is providing useful outputs that can be used to determine the sentiment and corresponding sentiment score for a communications session. Based on this evaluation, the language processing algorithm 204 may be modified (e.g., one or more parameters or variables may be updated) to increase the likelihood of the language processing algorithm 204 generating the desired results.

In an embodiment, the language processing algorithm 204 includes one or more NLP algorithms that can automatically annotate audial communications exchanged between users and agents (e.g., live agents 106, agent bots 116, etc.) in real-time as these audial communications are exchanged to distinguish user communications and agent communications from the communications session. As described in greater detail herein, these annotations may assist the transcription sub-system 206 in generating transcripts of these communications sessions. As noted above, the agent bot 116 may be implemented using NLP, interactive voice recognition systems, and other forms of conversational voice algorithms and systems, which may allow the agent bot 116 to communicate with the user 108, through the communications session, using audial communications. Thus, when the agent bot 116, through the communications session, prompts the user 108 to provide their affirmative consent to being recorded during the communications session, the language processing algorithm 204 may automatically, and in real-time, process any subsequent user communications to determine whether the user 108 has provided their affirmative consent to being recorded during the communications session.

If the user 108 indicates, through the communications session and in response to the prompt from the agent bot 106, that the user 108 does not wish to have their communications recorded, the language processing algorithm 204 may transmit an instruction to a transcription sub-system 206 implemented by the conversation recording system 104 to only record agent communications exchanged over the communications session and to generate a transcript of the communications session that only includes these agent communications. For instance, the language processing algorithm 204 may only provide any agent communications exchanged during the communications session while omitting any identified user communications. In some instances, the language processing algorithm 204 may automatically annotate each exchanged communication, in real-time and as these communications are exchanged, to indicate the source of the communication (e.g., user 108, live agent 106, etc.). This may allow the transcription sub-system 206 to readily determine which communications are to be transcribed and which recordings are to be preserved. For instance, if the user 108 has indicated that they do not wish to have their communications recorded during the communications session, the transcription sub-system 206 may only generate a transcription of agent communications in real-time as communications are exchanged during the communications session. As another illustrative example, if the user 108 does provide their affirmative authorization for recording of their communications exchanged during the communications session, the transcription sub-system 206 may automatically, and in real-time, generate a transcription of each of the exchanged communications as these communications are exchanged during the communications session. The transcription sub-system 206 may be implemented on a computer system or other system (e.g., server, virtual machine instance, etc.) associated with the conversation recording system 104. Alternatively, the transcription sub-system 206 may be implemented as an application or other process executed on a computing system of the conversation recording system 104.

In an embodiment, prior to the user 108 providing their affirmative consent to being recorded during the communications session, any communications exchanged between the user 108 and the agent bot 116 are automatically processed by the transcription sub-system 206 to generate a transcription of each of these communications as these communications are exchanged. These transcriptions of the communications exchanged between the user 108 and the agent bot 116 may be generated by the transcription sub-system 206 without the communication processing sub-system 202 generating a recording of these communications. Additionally, in some instances, the communication processing sub-system 202, through the language processing algorithm 204, may isolate any agent bot 116 communications and record these communications in real-time without recording any of the user communications exchanged over the communications session prior to the user 108 providing their affirmative consent to being recorded.

In an embodiment, once the user 108 has provided their response to the prompt from the agent bot 106 regarding their affirmative consent to being recorded during the communications session, the communication processing sub-system 202 transfers the communications session from the agent bot 116 to a live agent 106. For instance, in an embodiment, the brand platform service 102, through a dynamically trained machine learning algorithm or artificial intelligence, can evaluate the user's request to initiate a communications session to extract an intent expressed by the user 108 and that may be used to identify a live agent 106 that may be able to address the intent or issue expressed by the user 108. In some instances, the evaluation of the user's request may be performed by the language processing algorithm 204, which may automatically process the user's communications exchanged during the communications session to identify the user's particular intent or issue that they may want to have addressed. For instance, prior to transferring the communications session to a live agent 106, the agent bot 116 may prompt the user 108 to indicate the particular intent or issue that they wish to have addressed. The language processing algorithm 204 may automatically process any subsequent user communications to identify the intent or issue expressed by the user 108 in response to the prompt from the agent bot 116. For instance, the language processing algorithm 204 may perform a semantic analysis of these subsequent communications (e.g., by identifying keywords, sentence structures, repeated words, punctuation characters and/or non-article words) to identify the intent expressed in the request, as described above.

In an embodiment, the conversation recording system 104 uses the extracted intent to identify a live agent 106 that may be added to the communications session in order to converse with the user 108 over the communications session to address the user's intent or issue. As noted above, a live agent 106 may be selected based on one or more factors such as, for example, an extent to which the agent's knowledge base corresponds to the expressed intent or other issue expressed by the user 108, the agent's availability, the agent's location in relation to the location of the user 108 and the like. The conversation recording system 104, in some examples, may evaluate a set of agent profiles corresponding to the set of live agents 106 to select a particular agent profile according to a correlation of the agent profile to the identified intent or issue. The correlation of the agent profile to the intent or issue may indicate that the intent or issue matches, or is closest to, an intent of which the agent 106 is knowledgeable or has experience, for example. In some instances, the conversation recording system 104 may automatically identify the first available live agent 106 for the communications session.

As the user 108 and the live agent 106 communicate with one another through the communications session, the language processing algorithm 204 may automatically, and in real-time, process any communications between the user 108 and the live agent 106 as these communications are exchanged in order to isolate the user and live agent communications. For instance, the language processing algorithm 204 may automatically identify voice signatures or other audial signatures that may uniquely correspond to the user 108 and the live agent 106. As noted above, the agent bot 116 may process any communication provided by the user 108 in response to the agent bot's solicitation for affirmative consent to determine a voice signature that is unique to the user 108. This unique voice signature may be used by the language processing algorithm 204 to automatically identify user communications exchanged through the communications session. In some instances, the language processing algorithm 204 may automatically process the communications exchanged during the communications session in real-time to determine unique voice signatures associated with the user 108 and the live agent 106. For instance, for each newly received communication, the language processing algorithm 204 may automatically process the communication to generate a voice signature corresponding to the communication. Further, the language processing algorithm 204 may determine the purpose of the communication and determine whether it corresponds to the user 108 or the agent bot 116.

As noted above, the conversation recording system 104 may maintain, in a recording datastore 110, voice signatures for each of the live agents 106 associated with the brand platform service 102. When the communications session is established between the user 108 and a live agent 106, the communication processing sub-system 202 may automatically retrieve, from the recording datastore 110, data associated with the voice signature corresponding to the live agent 106. This voice signature may be provided to the language processing algorithm 204, which may use the voice signature to automatically identify any agent communications exchanged through the communications session. As the user 108 and live agent 106 may be the only participants in the communications session, any communications not corresponding to the live agent 106 may be classified as being associated with the user 108. Any communications not corresponding to the live agent 106 may be processed by the language processing algorithm 204 subject to any applicable recording restrictions as described herein.

In an embodiment, if the communications session is facilitated through distinct communications channels (e.g., a first communications channel corresponds to the user 108, a second communications channel corresponds to the live agent 106, etc.), the language processing algorithm 204 may automatically identify and record the different communications channels according to any applicable recording restrictions. For instance, if the user 108 has not provided their affirmative consent to being recording during the communications session, the language processing algorithm 204 may automatically ignore the communications channel associated with the user 108 while automatically recording, in real-time, the communications channel associated with the live agent 106. Alternatively, if the user 108 has provided their affirmative consent to being recorded during the communications session, the language processing algorithm 204 may automatically record the communications channels associated with the user 108 and the live agent 106. The language processing algorithm 204 may annotate these communications channels such that a transcript of the communications session (as described in greater detail herein) may identify the entity to which each exchanged communication is associated with.

In an embodiment, as the language processing algorithm 204 processes, in real-time, any communications between the user 108 and the live agent 106 as these communications are exchanged, the language processing algorithm 204 can automatically record and annotate each of these communications for transcription. For example, if the user 108 has opted to not provide their affirmative consent to being recorded, the language processing algorithm 204 may automatically, and in real-time, process any communications between the user 108 and the live agent 106 as these communications are exchanged to identify any agent communications. These agent communications may be recorded in an audial recording file using any appropriate encoding format, such as through MP3, AAC, FLAC, ALAC, WAV, AIFF, DSD, or any other appropriate lossy, lossless, or uncompressed audio formats. Further, any user communications may be omitted from the recording. For instance, the language processing algorithm 204 may replace any user communications with white noise or other indication of removal of user communications within the recording. Alternatively, the language processing algorithm 204 may condense the recording such that agent communications exchanged during the communications session are recorded without any gaps between individual agent communications.

The language processing algorithm 204 may automatically include, with the audial recording file, metadata that may be used to uniquely identify the recording and the properties associated with the recording. For example, the metadata may include a unique identifier corresponding to the communications session being recorded. Further, the metadata may indicate whether the recording is subject to any recording restrictions, which may serve as an indication as to whether the recording includes only agent communications or includes a complete recording of the communications session (e.g., both user and agent communications). Further, the language processing algorithm 204 may indicate, through the metadata associated with the recording, timestamps corresponding to each of the communications exchanged during the communications session and included the recording, as well as timestamps corresponding to the beginning and end of the communications session. These timestamps may assist the transcription sub-system 206 in generating a transcription of the communications session recording. For instance, if the communications session is subject to one or more recording restrictions, whereby user communications are not to be recorded, the metadata associated with the recording of the communications session may include timestamps corresponding to each agent communication included in the recording. However, if the user 108 has provided their affirmative consent to being recorded during the communications session, the metadata associated with the recording of the communications session may include timestamps corresponding to each user and agent communication included in the recording.

As noted above, if the communications session between the user 108 and the live agent 106 was established with the user's affirmative consent to being recorded during the communications session, the conversation recording system 104 may continue to monitor user communications, in real-time, as these user communications are exchanged to determine whether the user 108 has revoked their consent to being recorded. For instance, during the communications session, the language processing algorithm 204 may automatically process each user communication in real-time as it is exchanged to automatically detect any anchor terms or phrases that may correspond with a request to cease recording of user communications. If the language processing algorithm 204 detects one or more anchor terms or phrases that correspond to the user 108 having revoked their affirmative consent to being recorded, the language processing algorithm 204 may cease recording of user communications during the communications session. However, the language processing algorithm 204 may continue to identify and record any agent communications exchanged during the communications session, as described above.

In an embodiment, if the user 108 revokes their affirmative consent to being recorded during the communications session, the communication processing sub-system 202 retrieves, from the recording datastore 110, the recording of the communications session to remove any user communications previously recorded during the communications session prior to the user 108 having revoked their affirmative consent to being recorded. For instance, the communication processing sub-system 202, through the language processing algorithm 204, may process in real-time the recording of the communications session to identify any user communications exchanged during the communications session. The language processing algorithm 204 may remove any identified user communications from the recording according to any of the methods described above (e.g., replacement of user communications with white noise or other indicators denoting removal of user communications, condensing of the recording to include only agent communications, etc.).

In addition to removing user communications from the recording of the communications session in response to revocation of the user's affirmative consent to being recorded, the communication processing sub-system 202 may transmit an instruction to the transcription sub-system 206 to remove any transcriptions of user communications from the transcript corresponding to the communications session. The transcription sub-system 206, in response to this instruction, may modify the existing transcript corresponding to the communications session to remove any transcriptions of user communications exchanged during the communications session. For instance, using the metadata associated with the recording of the communications session, the transcription sub-system 206 may automatically identify the timestamps corresponding to the user communications exchanged during the communications session. Using these timestamps, the transcription sub-system 206 may automatically identify the transcriptions of the user communications includes in the transcript and remove these from the transcript. In some instances, if the recording does not include metadata indicating the presence and location of user communications within the recording, the transcription sub-system 206 may automatically process the existing transcript associated with the communications session to identify any anchor terms or phrases that may be indicative of user communications (similar to the process performed by the language processing algorithm 204 described above). Alternatively, the transcription sub-system 206 may automatically generate a new transcript based on the modified recording of the communications session.

The transcription sub-system 206, in an embodiment, includes one or more NLP algorithms that are dynamically trained to automatically convert recordings of user and agent communications in real-time as these communications are exchanged into text that may be used to construct a transcript of the communications session. As noted above, these one or more NLP algorithms may be dynamically trained to automatically, and in real-time, process the communications exchanged between the user 108 and the agent 106 as these communications are exchanged over the communications session to generate textual representations of these communications. These textual representations of the communications session may be recorded in a transcript corresponding to the communications session. The transcription sub-system 206 may store the resulting transcript and the original recording of the communications session in the recording datastore 110. As noted above, the recording datastore 110 may be repository or database that maintains entries corresponding to different communications sessions facilitated by the brand platform service 102. For instance, an entry within the recording datastore 110 may include a unique identifier corresponding to a particular communications session, identification information corresponding to the user and live agent(s) involved in the communications session, any applicable recording restrictions associated with the communications session, any indications of affirmative consent provided by the user associated with the communications session, and the recording of the communications session. Further, the entry may include the transcript corresponding to the communications session. The entry may be continuous updated, in real-time, as new communications exchanged during the communications session are processed by the language processing algorithm 204 and transcribed by the transcription sub-system 206.

In an embodiment, the transcription sub-system 206 automatically generates, in real-time, transcriptions of communications exchanged amongst the user 108, the agent bot 116, and any live agent 106 engaged in the communications session according to any applicable recording restrictions and as these communications are exchanged. For instance, in an embodiment, the transcription sub-system 206, using real-time ASR, can automatically process any exchanged communications over the communications session in real-time and as these communications are exchanged (such as through an active audio stream or other data stream associated with the communications session) to generate a transcription of each of these communications without need for recordings of these communications. For instance, the transcription sub-system 206, through a live data stream, may receive any communications between the user 108 and a live agent 106 in real-time and as the communications are exchanged to generate, using real-time ASR, corresponding transcriptions of these communications. The transcriptions of these communications may be provided, in real-time and as these transcriptions are generated, to the communication analytics sub-system 208 for generating and/or updating agent performance metrics and/or conversation analytics that may be used to identify any user characteristics of the user 108.

In an embodiment, the transcription sub-system 206 can persistently store these transcriptions in the recording datastore 110, subject to any applicable recording restrictions. For instance, if the user 108 has not provided their affirmative consent to being recorded during the communications session, and the applicable recording restrictions prohibit recording or transcribing user communications absent their affirmative consent to being recorded, the transcription sub-system 206 may store, in the recording datastore 110, a transcription of the communications session that only includes the transcriptions of agent communications exchanged during the communications session. Alternatively, if the user 108 has provided their affirmative consent to being recorded during the communications session, the transcription sub-system 206 may store a transcription of the complete communications session. In some instances, if the applicable recording restrictions prohibit audial recording of user communications without the user's affirmative consent, but otherwise allow for transcriptions of user communications, the transcription sub-system 206, through real-time ASR, can generate a transcript of the communications session that includes transcriptions of both user and agent recordings. In an embodiment, the transcription sub-system 206 can automatically delete any transcripts of the communications session once these transcripts have been used to generate a set of metrics corresponding to agent performance during the communications session and user feedback corresponding to the communications session.

In an embodiment, the brand platform service 102 implements a communication analytics sub-system 208 that can generate and provide various analytics corresponding to agent performance regardless of whether recordings include user communications or not. The communication analytics sub-system 208 may be implemented on a computer system or other system (e.g., server, virtual machine instance, etc.) associated with the brand platform service 102. Alternatively, the communication analytics sub-system 208 may be implemented as an application or other process executed on a computing system of the brand platform service 102. As illustrated in FIG. 2, the communication analytics sub-system 208 may implement a performance metrics algorithm 212, which may be dynamically trained to process, in real-time, recordings and/or transcripts corresponding to communications sessions between users and agents as communications are exchanged during these communications sessions to generate a set of agent performance metrics. As noted above, the performance metrics algorithm 212 may be trained using sample recordings and/or transcripts corresponding to communications sessions between users (e.g., actual users, entities acting as users for creation of sample recordings and/or transcripts, etc.) and agents (e.g., actual agents, entities acting as agents for creation of sample recordings and/or transcripts, etc.) and corresponding feedback provided with regard to performance metrics generated by the machine learning algorithm or artificial intelligence based on the sample recordings and/or transcripts.

The performance metrics algorithm 212 may automatically generate, in real-time and as communications are exchanged through the communications session, various performance metrics corresponding to the performance of the live agent 106 during the communications session. These performance metrics may be generated regardless of whether the recordings and/or transcripts associated with the communications session include user communications or not. For instance, the performance metrics algorithm 212 may calculate a set of performance metrics associated with the amount of effort required by a live agent 106 to address a user's intent or issue during a communications session. Returning to the illustrative example described above, if a user 108 required repeated communications with the agent 106 to address their issue or experienced significant wait times to have their issue addressed, the performance metrics algorithm 212 may assign a score corresponding to a high amount of effort required to address user's particular intent or issue. A high score may correspond to a high amount of effort required to address a user's intent or issue, whereas a low score may correspond to a low amount of effort required by the live agent 106 to address the user's particular intent or issue.

The performance metrics algorithm 212 may further automatically calculate a set of performance metrics corresponding to the level of emotion associated with the user 108 during the communications session. For instance, certain intents (e.g., cancellations, billing disputes, etc.) may have a higher propensity to drive emotionally charged communications sessions and, in turn, result in a higher number of complaints or escalation. Thus, for such communications sessions, the performance metrics algorithm 212 may calculate an emotion score corresponding to a negative emotional load for the user 108. However, if the user's intent or issue is resolved positively through the communications session, the performance metrics algorithm 212 may calculate an emotion score corresponding to a positive emotional load for the user 108. In some instances, the performance metrics algorithm 212 may further calculate an emotion score based on any user references to competitors or other entities. For example, if a user 108 indicates, during the communications session, that they will take their business to a particular competitor, the performance metrics algorithm 212 may calculate an emotion score corresponding to a negative emotional load for the user 108. As another illustrative example, if the user 108 indicates, during the communications session, that they are willing to cancel their account if their issue or intent is not resolved in a satisfactory manner, the performance metrics algorithm 212 may calculate an emotion score corresponding to a negative emotional load for the user 108.

In some instances, an emotion score may be calculated based on an agent's actions in response to user communications and corresponding user feedback provided through the communications session. As an illustrative example, if an agent 106 prompts the user 108 to provide their telephone number in order to update the user's account or to re-establish the communications session should the user 108 be disconnected from the agent 106, and the user 108 provides their telephone number, the performance metrics algorithm 212 may determine whether the agent 106 accurately entered the provided telephone number and confirmed this with the user 108. If the user 108 indicates that the agent 106 has not recorded the user's telephone number correctly (e.g., the agent 106 has recited an incorrect telephone number, the agent 106 prompts the user 108 to repeat the telephone number, etc.), the performance metrics algorithm 212 may calculate an emotion score corresponding to a negative emotional load for the user 108. Further, the performance metrics algorithm 212 may generate a recommendation for actions that may be taken by the agent 106 to improve their likelihood in providing satisfactory responses to user communications in order to improve user emotion scores.

In some instances, the performance metrics algorithm 212 can store intent data corresponding to user intents expressed during a communications session. The intent data may include, for a particular communications session, any intents detected by the conversation recording system 104 during the course of the particular communications session. Returning to an earlier illustrative example, whereby the user 108 has indicated, during the communications session, that they will take their business to a particular competitor, the performance metrics algorithm 212 may determine whether the conversation recording system 104 has detected this intent. If the conversation recording system 104 has failed to detect this intent or has associated the user's communication of their intent with an alternative intent, the performance metrics algorithm 212 may indicate that an error has occurred. Alternatively, if the conversation recording system 104 has correctly detected this intent and has identified the intent accordingly, the performance metrics algorithm 212 may determine that the conversation recording system 104 is accurately detecting the intents expressed by the user 108 during the communications session. This evaluation performed by the performance metrics algorithm 212 may result in one or more metrics that may be used to improve the performance of the conversation recording system 104 in automatically identifying user intents expressed during different communications sessions.

Additionally, the performance metrics algorithm 212 may further determine the level of efficiency of the agent 108 in handling the user's particular intent or issue during the communications session to calculate an efficiency score for the agent 106. As noted above, the performance metrics algorithm 212 may determine the length of time required for the agent 106 to respond to user communications exchanged during the communications session. For instance, if the agent 106 requires a significant amount of time to respond to a user 108 or if there is a significant pause in the communications session, the performance metrics algorithm 212 may assign an efficiency score corresponding to a low level of efficiency for the agent 106. Alternatively, if the agent 106 is responsive to user communications, the performance metrics algorithm 212 may assign an efficiency score corresponding to a higher level of efficiency for the agent 106.

In addition to the aforementioned performance metrics, the performance metrics algorithm 212 may generate performance metrics corresponding to the agent's level of effectiveness in addressing the user's particular intent or issue during the communications session. For example, based on the real-time evaluation of the recording of the communications session between the agent 106 and the user 108, the performance metrics algorithm 212 may determine that the agent 106 is not leveraging available tools for resolving the user's particular intent or issue. Based on this determination, the performance metrics algorithm 212 may assign an effectiveness score corresponding to a low level of effectiveness for the agent 106. Similarly, if the performance metrics algorithm 212, based on its real-time evaluation of the recording, determines that the agent 106 is communicating with the user 108 at a rapid rate while leaving little to no time for the engineering of solutions to the user's particular intent or issue, the performance metrics algorithm 212 may assign an effectiveness score corresponding to a low level of effectiveness for the agent 106.

The brand platform service 102 may dynamically train the performance metrics algorithm 212 to identify and/or infer any implied elements corresponding to user communications from any recorded agent communications in the event that a recording and/or transcript of the communications session does not include any user communications. For example, the performance metrics algorithm 212 may be dynamically trained using a dataset that includes sample recordings that include, for each sample communications session, a recording that includes both user and agent communications and a recording that only includes agent communications. The dataset may further indicate, for each recording pairing, the expected elements corresponding to the user communications that are to be determined from evaluation of corresponding agent communications. The complete sample recording including both the user and agent communications may serve as the ground truth for the determination of the user's intent and sentiment, as described above, which may be used to dynamically re-train the performance metrics algorithm 212 to improve its accuracy in determining the user's intent and sentiment, as well as the agent's performance during the communications session. The dataset, in some examples, may further include sample transcripts of communications sessions (e.g., historical communications sessions, sample communications sessions, etc.) that include transcriptions of both user and agent communications. The dataset may further include sample transcripts of these communications sessions that only include agent communications. The complete sample transcripts (including transcriptions of user and agent communications), in this instance, may serve as the ground truth for the determination of the user's intent and sentiment, as described above.

In an embodiment, the performance metrics algorithm 212 can automatically, and in real-time, process transcriptions of communications exchanged during an active communications session as these communications are exchanged. As noted above, the communication processing sub-system 202 may implement real-time ASR for generating, in real-time, transcriptions of each communication exchanged amongst the user 108, the agent bot 116, and any live agent 106 engaged in the communications session. In an embodiment, these communications are automatically processed, in real-time and as these communications are exchanged, by the transcription sub-system 206 to generate a real-time transcription of a newly exchanged communication that is exchanged over the communications session. For example, if a user 108 exchanges a new communication with an agent 106, the transcription sub-system 206, using real-time ASR, may perform real-time transcription of the new communication. These transcriptions may be generated in real-time without recording any of the underlying communications exchanged over the communications session and regardless of the applicability of any recording restrictions.

As the transcription sub-system 206 generates new transcriptions of newly exchanged communications during the communications session, the transcription sub-system 206 may automatically, and in real-time, transmit these new transcriptions to the performance metrics algorithm 212 for processing. If the communications session is subject to one or more recording restrictions, whereby the recording of the new communication cannot be persistently stored, the transcription of the new communication may be discarded once the transcription of the new communication is generated by the transcription sub-system 206 and used for generating the one or more performance metrics, as described above.

In an embodiment, rather than storing the transcription of the new communication in the recording datastore 110, the transcription sub-system 206 automatically, and in real-time, transmits the transcription of the new communication to the performance metrics algorithm 212 as the transcription is generated for processing. The performance metrics algorithm 212 may dynamically, and in real-time, process the transcription of the new communication to generate and/or update a set of performance metrics for the agent 106 engaged in the communications session. For example, if a user 108 expresses, in a new communication exchanged over the communications session, that the user 108 is dissatisfied with the agent's response to the user's intent, the performance metrics algorithm 212 may automatically, and in real-time, process the transcription of this new communication to dynamically update the set of performance metrics corresponding to the agent 106 such that the updated set of performance metrics are indicative of the agent's inability to address the user's intent. As real-time transcriptions of individual communications are generated by the transcription sub-system 206 and provided to the performance metrics algorithm 212, the performance metrics algorithm 212 may dynamically and in real-time process these real-time transcriptions as they are received to continuously update the set of performance metrics corresponding to the agent 106.

In an embodiment, if the communications session is subject to one or more recording restrictions, whereby persistent recordings are user communications are not to be generated and stored, the communication analytics sub-system 208 automatically, and in real-time, discards any temporary recordings of user communications used to generate transcriptions of these user recordings and for generating or updating the set of performance metrics associated with agents engaged in the communications session. Further, the communication analytics sub-system 208 may automatically discard any transcriptions of user communications provided by the transcription sub-system 206 used to update the set of performance metrics and that are subject to the one or more recording restrictions. Thus, the recordings and transcriptions of user communications generated for the purpose of generating the set of performance metrics may be automatically discarded without ever being persistently stored if user communications are subject to any applicable recording restrictions.

The performance metrics algorithm 212, in an embodiment, is dynamically updated in real-time as communications are exchanged between users and agents during their respective communications sessions, regardless of whether the recordings and/or transcripts corresponding to these communications sessions include any user communications or not. For instance, as the performance metrics algorithm 212 processes, in real-time, the recordings and/or transcripts (e.g., communications transcriptions generated in real-time as communications are exchanged during a communications session, complete transcripts provided upon conclusion of the communications session, etc.) corresponding to different communications sessions to generate a set of performance metrics for agents engaged in these communications sessions, the performance metrics algorithm 212 may be evaluated in order to determine the accuracy of this set of performance metrics. For example, one or more evaluators (e.g., administrators of the brand platform service 102, third-party evaluators, etc.) may review the transcripts and/or recordings corresponding to these communications sessions and the corresponding performance metrics determined using the performance metrics algorithm 212 to determine whether these performance metrics comport with the actual performance of the agents engaged in these communications sessions. Further, the one or more evaluators may solicit or otherwise obtain user feedback with regard to agent performance during these communications sessions. This user feedback may further serve as a measure of the ground truth regarding agent performance during these communications sessions. For instance, if the performance metrics for a particular agent correspond to a positive agent performance during a particular communications session, but a user has provided feedback with regard to the communications session indicating that the agent was unable to determine the user's intent and was unable to assist the user with their particular issue, an evaluator may determine that the performance metrics algorithm 212 has produced inaccurate performance metrics for this particular agent. Thus, based on this evaluation of the performance metrics algorithm 212, the performance metrics algorithm 212 may be dynamically re-trained to improve the likelihood of the performance metrics algorithm 212 in providing accurate performance metrics for agents engaged in communications sessions with users.

In an embodiment, the performance metrics algorithm 212 is further dynamically re-trained or updated in real-time as additional communications are obtained and processed. For instance, as these additional communications are used to dynamically update the recordings and/or transcripts associated with the underlying communications sessions (regardless of whether these recordings and/or transcripts include user communications), the performance metrics algorithm 212 may be continuously evaluated in real-time to determine the accuracy of the performance metrics being generated for the agents engaged in these communications sessions. This continuous evaluation may be performed as the performance metrics algorithm 212 simultaneously processes communications corresponding to different and concurrent communications sessions amongst different users and agents.

As noted above, agent responses during a communications session may be evaluated to determine whether the agent engaged in the communications session has performed any tasks required by the brand platform service 102. In an embodiment, the performance metrics algorithm 212 is dynamically trained to automatically process, in real-time, agent communications during a communications session to determine whether the agent 106 has performed any of these required tasks. For instance, the performance metrics algorithm 212 may perform a semantic analysis of the agent communications (as provided in the recording, transcription of agent communications, and/or complete transcript of the communications session) to identify one or more keywords that may be associated with particular tasks assigned to the agent 106. As an illustrative example, if the agent 106 states, during a communications session that "your refrigerator is covered by a ten-year warranty," the performance metrics algorithm 212 may automatically detect the anchor term "covered" and the anchor phrase "ten-year warranty." Based on the anchor term and anchor phrase, the performance metrics algorithm 212 may determine that the agent 106 has read a set of terms and conditions related to the user's refrigerator. Further, the performance metrics algorithm 212 may determine, for the particular intent associated with the communications session, whether the reading of this set of terms and conditions is applicable to the communications session. For instance, if the particular intent or issue is related to a billing inquiry, and the agent 106 has read a set of terms and conditions associated with a product the user 108 has not purchased or that otherwise is not germane to the communications session, the performance metrics algorithm 212 may flag this interaction as not being conducive to addressing the user's particular intent or issue. This flag may be used to adjust the agent's performance metrics for the communications session.

In an embodiment, the performance metrics algorithm 212 is further dynamically trained to process the performance metrics associated with one or more agents 106, as well as the evaluations corresponding to agent performance of required tasks for particular intents or issues, to provide one or more recommendations for how to improve agent performance. For instance, if the performance metrics algorithm 212 determines that an agent 106 has taken too long during one or more communications sessions to respond to corresponding users (based on the agent's performance metrics and evaluations), the performance metrics algorithm 212 may automatically generate a recommendation indicating that agent performance may be improved through remedial training, through which the agent 106 may be trained to better identify intents or issues using automated tools or other available resources.

As the performance metrics algorithm 212 generates performance metrics corresponding to agent performance during the various communications sessions and recommendations for actions that may be performed to improve agent performance, the communication analytics sub-system 208 may transmit these conversation analytics (e.g., performance metrics, recommendations, etc.) to the one or more live agents 106. In some instances, the communication analytics sub-system 208 may track adherence by agents 106 to the recommendations provided by the performance metrics algorithm 212, whereby the communication analytics sub-system 208 may correlate adherence to these recommendations to the performance of the agents 106 in providing a positive experience to users associated with the brand platform service 102. These correlations may be used to further dynamically re-train the performance metrics algorithm 212 to improve the likelihood of the performance metrics algorithm 212 providing appropriate recommendations that, if adhered to, may improve agent performance.

Figure 3:
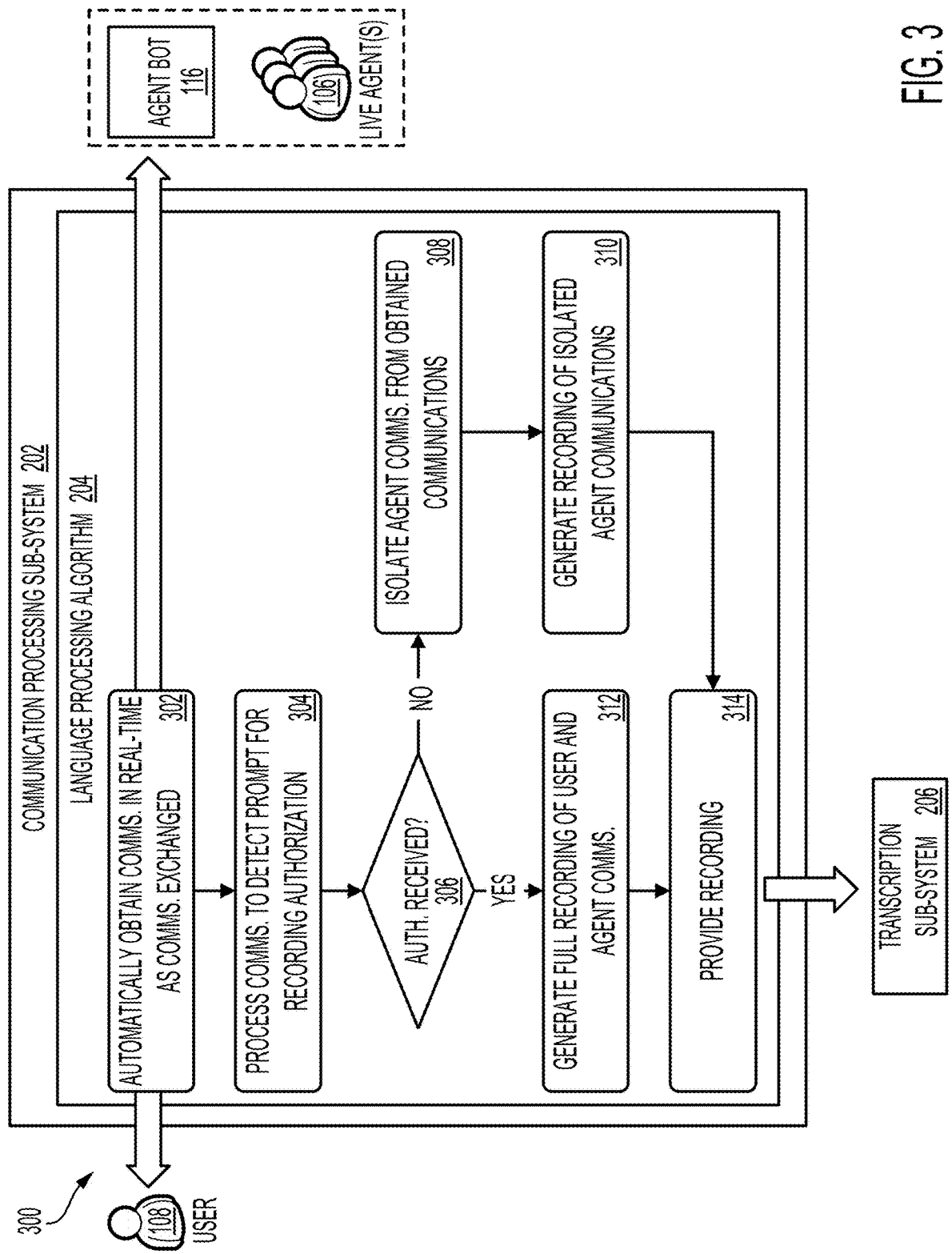
FIG. 3 shows an illustrative example of an environment in which a language processing algorithm is implemented to process communications between a user and a set of agents to isolate and record particular communications from a communications session according to any specified recording restrictions in accordance with at least one embodiment.

FIG. 3 shows an illustrative example of an environment 300 in which a language processing algorithm 204 is implemented to process communications between a user 108 and a set of agents (e.g., agent bot 116, live agents 106, etc.) to isolate and record particular communications from a communications session according to any specified recording restrictions in accordance with at least one embodiment. As noted above, a user 108 may transmit a request to the brand platform service to initiate a communications session with an agent 106 in order to address a particular intent or issue. For instance, the user 108 may access the brand platform service to request assistance with a billing issue related to an account associated with a particular brand associated with the brand platform service. As another example, the user 108 may access the brand platform service to address a technical question related to an appliance or product associated with the particular brand. In response to this request, the brand platform service may establish a communications session between the user 108 and one or more agents (e.g., agent bot 116, one or more live agents 106, etc.) for resolution of the particular intent or issue.

In the environment 300, the language processing algorithm 204 implemented by the communication processing sub-system 202 may, at step 302, automatically obtain any communications exchanged between the user 108 and the one or more agents in real-time as these communications are exchanged over the communications session. For instance, when the communications session between the user 108 and the one or more agents is initially established, the language processing algorithm 204 may begin to monitor the communications session to detect any communications between the user 108 and these one or more agents. As noted above, in some instances, the brand platform service may determine whether an affirmative consent from the user 108 is required in order for user communications to be recorded. If the user's affirmative consent to being recorded is required in order to record any of the user's communications, the communication processing sub-system 202 may execute an agent bot 116 that may automatically solicit the user 108, through the communications session, for their affirmative consent to being recorded. In some instances, prior to prompting the user 108 for their affirmative consent to being recording during the communications session, the communication processing sub-system 202 may establish the communications session between the user 108 and a live agent 106 for addressing the particular intent or issue that the user 108 wishes to have resolved. However, the live agent 106 may be prevented from communicating with the user 108 until a determination is made regarding the user's authorization to being recorded during the communications session.

At step 304, the language processing algorithm 204 may automatically process the obtained communications in real-time as these communications are received in order to detect a prompt for the user 108 to provide their recording authorization. For instance, the language processing algorithm 204, using one or more NLP algorithms, may automatically annotate audial communications exchanged between users and agents (e.g., live agents 106, agent bots 116, etc.) in real-time as these audial communications are exchanged to distinguish user communications and agent communications from the communications session. When the agent bot 116, through the communications session, prompts the user 108 to provide their affirmative consent to being recorded during the communications session, the language processing algorithm 204 may automatically, and in real-time, process any subsequent user communications to determine, at step 306, whether the user 108 has provided their affirmative consent to being recorded during the communications session.

It should be noted that, in some instances, the user's affirmative consent to being recorded may not be required and, as a result, user communications may be automatically recorded by default. For instance, if the brand platform service determines, based on the geographic location associated with the user 108, that affirmative consent is not required in order to record user communications exchanged during a communications session with an agent 106, the brand platform service may facilitate the communications session between the user 108 and an agent 106 and record, in real-time, the communications exchanged between the user 108 and the agent 106 as these communications are exchanged. Thus, in these particular instances, the language processing algorithm 204 need not perform steps 304 and 306, as a prompt for recording authorization may not be required to record user communications.

Returning to the illustrative example where the user 108 is prompted to provide their affirmative consent to being recorded during the communications session, if the language processing algorithm 204 determines that the user 108 has not provided their authorization (e.g., affirmative consent) to being recorded, the language processing algorithm 204, at step 308, may isolate any agent communications from the obtained communications exchanged during the communications session. As noted above, once the user 108 has provided their response to the prompt from the agent bot 106 regarding their affirmative consent to being recorded during the communications session, the communication processing sub-system 202 may transfer the communications session from the agent bot 116 to a live agent 106. Further, as the user 108 and the live agent 106 communicate with one another through the communications session, the language processing algorithm 204 may automatically, and in real-time, identify voice signatures or other audial signatures that may uniquely correspond to the user 108 and the live agent 106 based on the exchanged communications in order to isolate the user and agent communications. If the communications session is facilitated through distinct communications channels (e.g., a first communications channel corresponds to the user 108, a second communications channel corresponds to the live agent 106, etc.), the language processing algorithm 204 may automatically identify and isolate the communications channel corresponding to the live agent 106.

At step 310, the language processing algorithm 204 may generate a recording of the communications session that only includes the isolated agent communications. For instance, the language processing algorithm 204 may automatically process, in real-time, any communications between the user 108 and the live agent 106 as these communications are exchanged to identify any agent communications. These agent communications may be recorded in an audial recording file using any appropriate encoding format, such as through MP3, AAC, FLAC, ALAC, WAV, AIFF, DSD, or any other appropriate lossy, lossless, or uncompressed audio formats. Further, any user communications may be omitted from the recording. For instance, the language processing algorithm 204 may replace any user communications with white noise or other indication of removal of user communications within the recording. Alternatively, the language processing algorithm 204 may condense the recording such that agent communications exchanged during the communications session are recorded without any gaps between any individual agent communications. In some instances, the language processing algorithm 204 may automatically include, with the recording, metadata that may be used to uniquely identify the recording and the properties associated with the recording. For example, the metadata may include a unique identifier corresponding to the communications session being recorded, an indication that the recording is subject to one or more recording restrictions, timestamps corresponding to each of the agent communications included the recording, and timestamps corresponding to the beginning and end of the communications session.

If the language processing algorithm 204, alternatively, has determined that the user 108 has provided their authorization (e.g., affirmative consent) to being recorded during the communications session (or affirmative consent is not required for recording user communications), the language processing algorithm 204, at step 312, may generate a complete recording of the communications session. This complete recording of the communications session may include both the user and agent communications exchanged during the communications session as these communications are exchanged. Further, the language processing algorithm 204 may annotate the complete recording of the communications session to distinguish user communications from agent communications exchanged during the communications session. For instance, the metadata associated with the complete recording of the communications session may indicate that the recording includes both user and agent communications exchanged during the communications session. Further, the language processing algorithm 204 may indicate, through the metadata associated with the recording, timestamps corresponding to each of the user and agent communications exchanged during the communications session and included in the recording, as well as timestamps corresponding to the beginning and end of the communications session.

At step 314, once the language processing algorithm 204 has generated a recording of the communications session according to the applicable recording restrictions and user's affirmative consent (if required), the language processing algorithm 204 may automatically provide the recording to the transcription sub-system 206. As noted above, the transcription sub-system 206 may automatically process the provided recording of the communications session to generate a transcript (e.g., textual representation, etc.) of the communications exchanged during the communications session. For example, if the recording of the communications session only includes agent communications exchanged during the communications session (e.g., the user 108 has not provided their affirmative consent to being recorded, etc.), the transcription sub-system 206 may automatically generate a transcript of this communications session that solely includes these agent communications. Alternatively, if the recording of the communications session includes both user and agent communications exchanged during the communications session, the transcription sub-system 206 may automatically generate a transcript of this communications session that includes a complete representation of the communications session.

In an embodiment, the process performed by the language processing algorithm 204 may be continuous, whereby the language processing algorithm 204 automatically updates, in real-time, the recording of the communications session as new communications are exchanged between the user 108 and the one or more agents (e.g., agent bot 116, live agents 106, etc.). These updated recordings may be automatically provided to the transcription sub-system 206 as these recordings are generated to allow the transcription sub-system 206 to dynamically update the corresponding transcript of the communications session in real-time. Further, through the continuous performance of this process, the language processing algorithm 204 may automatically process any newly obtained communications to determine whether the user 108 has revoked their previously provided affirmative consent to being recorded. As noted above, if the language processing algorithm 204 detects that the user 108 has revoked their previously provided affirmative consent to being recorded, the language processing algorithm 204 may retrieve the recording of the communications session to remove any user communications previously recorded during the communications session prior to the user's revocation of their affirmative consent. For instance, the language processing algorithm 204 may process in real-time the recording of the communications session to identify and remove any user communications exchanged during the communications session. Further, the language processing algorithm 204 may transmit an instruction to the transcription sub-system 206 to remove any transcriptions of user communications from the transcript corresponding to the communications session. The transcription sub-system 206, in response to this instruction, may modify the existing transcript corresponding to the communications session to remove any transcriptions of user communications exchanged during the communications session, as described above.

In some instances, the language processing algorithm 204 may perform additional and/or alternative operations otherwise not illustrated in FIG. 3. For example, in an embodiment, rather than generating a complete recording of the communications session according to any applicable recording restrictions, the language processing algorithm 204 can automatically and in real-time generate a temporary recording of a newly received communication exchanged over the communications session when the communication is exchanged. This temporary recording may be generated by the language processing algorithm 204 regardless of any applicable recording restrictions. The language processing algorithm 204 may provide, in real-time, the temporary recording of the newly received communication to the transcription sub-system 206 to generate a transcription of the temporary recording. If the temporary recording is not subject to any recording restrictions, the language processing algorithm 204 may create a persistent recording of the newly received communication that may be stored in the recording datastore. However, if the temporary recording is subject to one or more recording restrictions, the language processing algorithm 204 may automatically provide, with the temporary recording, an indication that the temporary recording is subject to these one or more recording restrictions. This indication may be provided as metadata associated with the temporary recording. This indication may cause the transcription sub-system 206 to generate a temporary transcription of the temporary recording. As noted above, the temporary recording and corresponding transcription of this newly received communication may be automatically discarded by the communication analytics sub-system once the transcription has been used to dynamically generate or update the set of performance metrics associated with the agent engaged in the communications session and/or the set of metrics associated with the user 108 (e.g., user profile, etc.).

It should be noted that, in some instances, communications exchanged during the communications session may be independently processed by the transcription sub-system 206 without the transcription sub-system 206 requiring the language processing algorithm 204 to provide any recordings, as described above in connection with step 314. As noted above, the transcription sub-system 206 may be implemented with real-time ASR, whereby the transcription sub-system 206 may automatically process, in real-time, any communications exchanged between a user 108 and an agent (e.g., agent bot 116, live agent 106, etc.) as these communications are exchanged to generate corresponding transcriptions of each of these communications. These transcriptions may be generated using the real-time ASR without need for recordings of the communications session from the language processing algorithm 204. In such instances, rather than providing the recordings to the transcription sub-system 206 (as described above in connection with step 314), the language processing algorithm 204 may store these recordings in the recordings datastore, as described above.

Figure 4A:
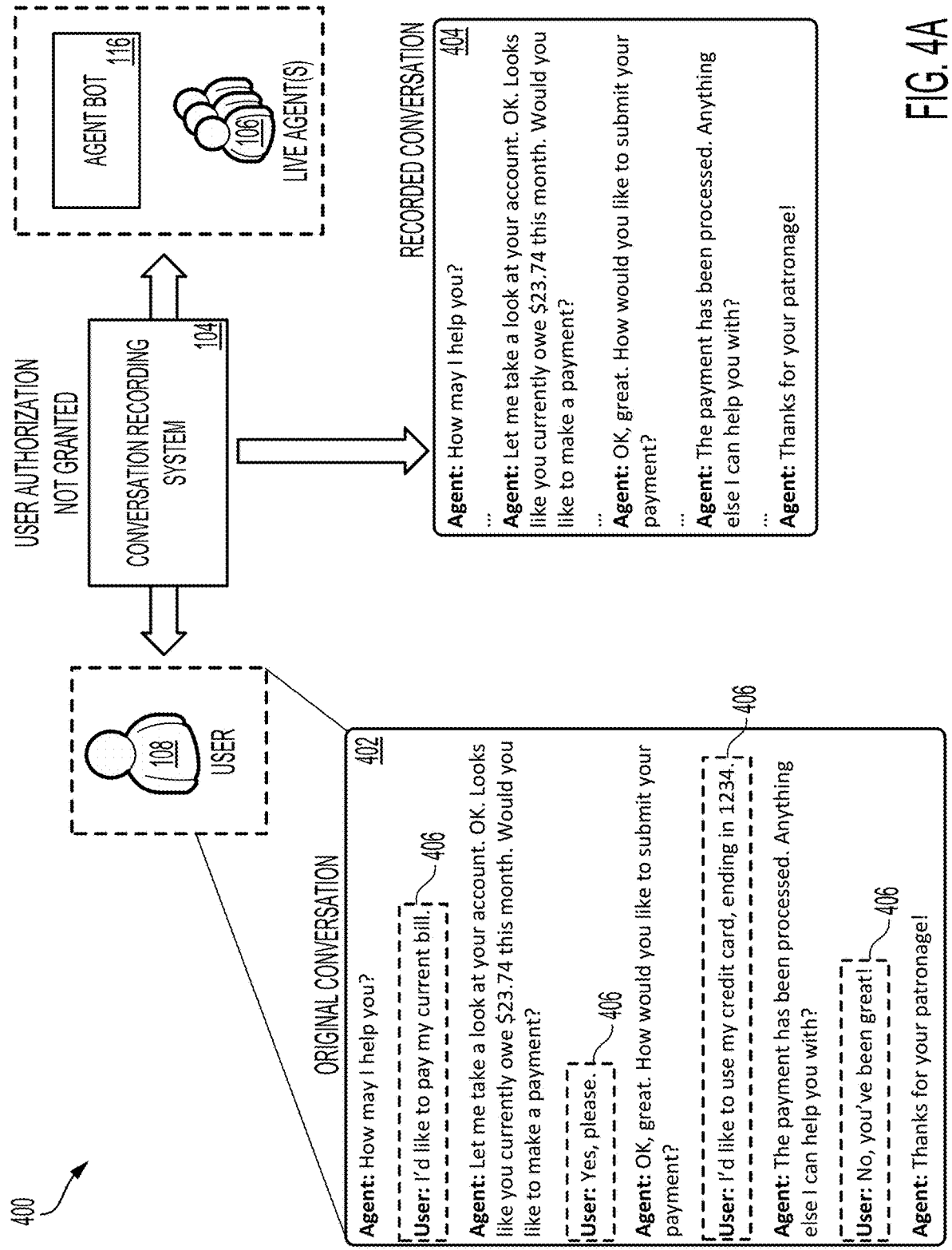
FIGS. 4A-4C show an illustrative example of an environment in which communications between a user and one or more agents are recorded in real-time according to any specified recording restrictions in accordance with at least one embodiment.
Figure 4B:
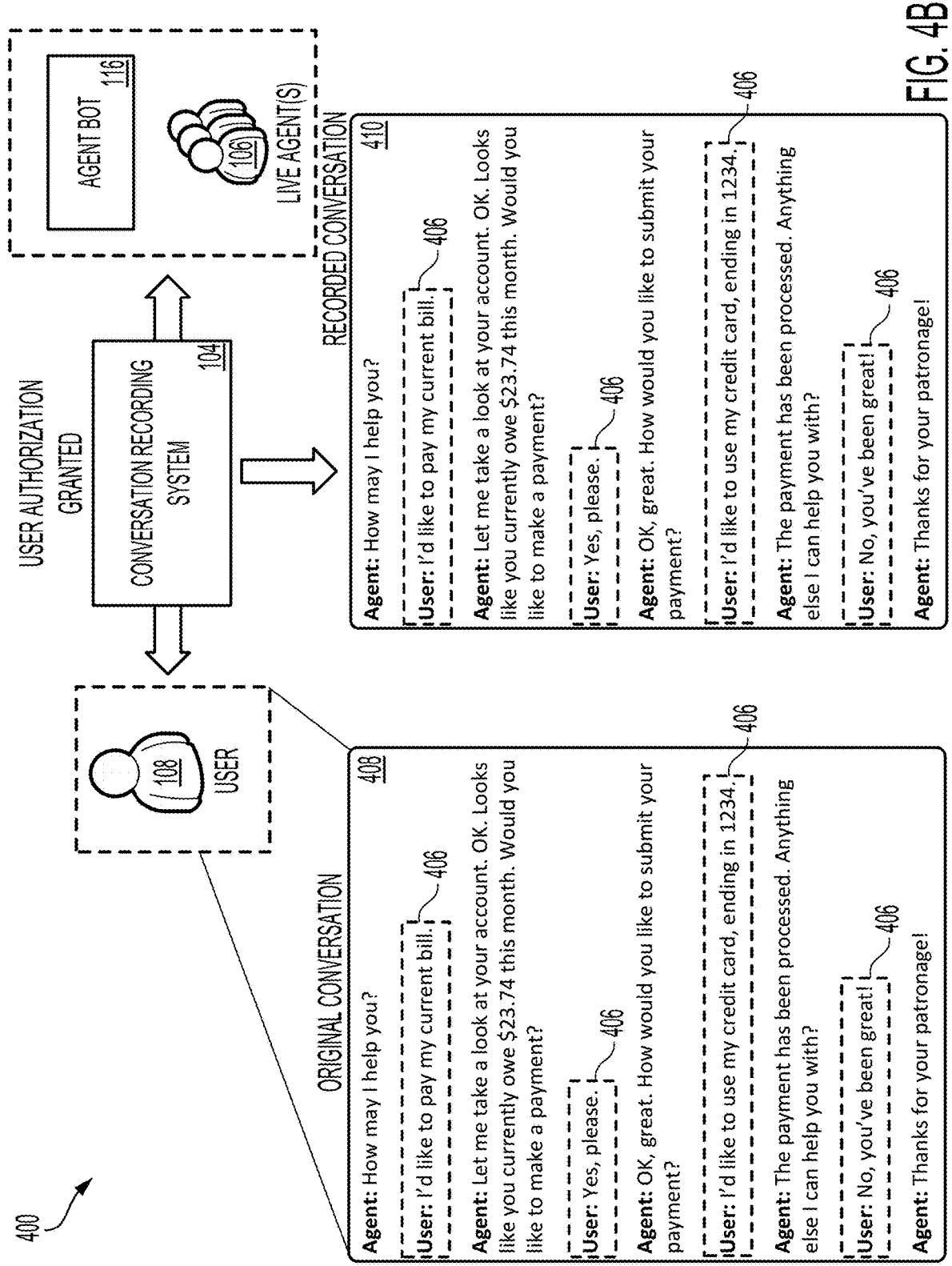
Figure 4C:
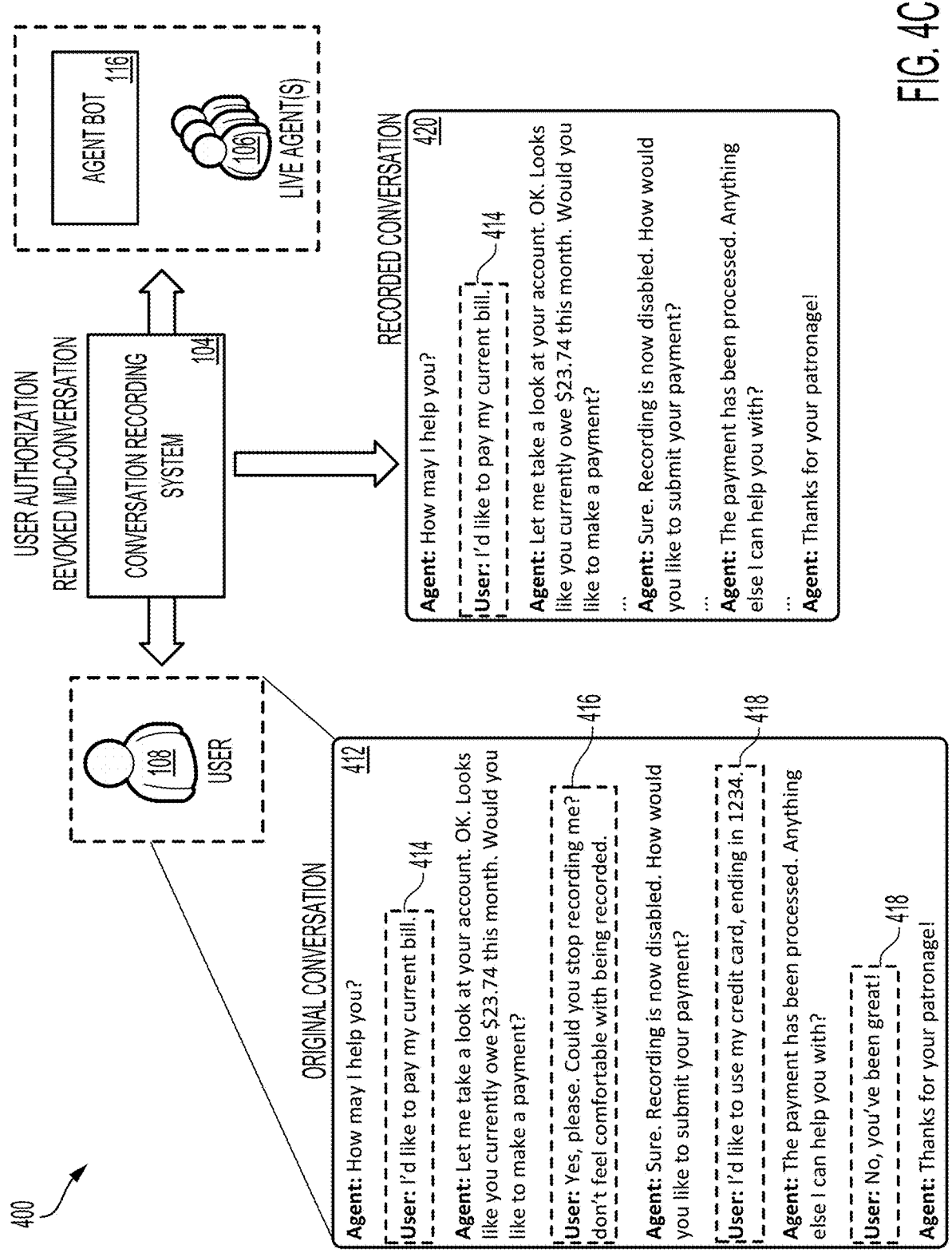

FIGS. 4A-4C show an illustrative example of an environment 400 in which communications between a user 108 and one or more agents (e.g., an agent bot 116, one or more live agents 106, etc.) are recorded in real-time according to any specified recording restrictions in accordance with at least one embodiment. As illustrated in FIG. 4A, the user 108 may be engaged in a communications session with one or more agents. This communications session may be monitored, in real-time, by a conversation recording system 104, which may be implemented to record the communications session in real-time and as communications are exchanged between the user 108 and the one or more agents subject to any applicable recording restrictions. As noted above, when a user submits a request to communicate with an agent in order to address a particular intent or issue, the conversation recording system 104 may determine whether an affirmative consent from the user 108 is required in order for user communications to be recorded. For instance, the conversation recording system 104 may determine whether an affirmative consent from the user 108 is required based on the user's present geographic location (e.g., city, state, country, zip code, area code, physical address, etc.). In some instances, the conversation recording system 104 may, by default, require the user's affirmative consent prior to recording any user communications, regardless of whether such consent is required based on jurisdiction, regulation, and the like.

As illustrated in FIG. 4A, the original conversation 402 between the user 108 and a live agent 106 may include various user communications 406 exchanged with the live agent 106 during the course of the communications session. For example, the original conversation 402 may begin with the user 108, through a user communication 406, requesting to pay their current bill. Through subsequent user communications 406 exchanged during the original conversation 402, the user 108 may affirm the live agent's inquiry as to whether the user 108 would like to make a payment and provide their payment information. Additionally, once the payment has been processed, through these subsequent user communications 406, the user 108 may provide feedback indicating that the live agent's performance was satisfactory and resolved the user's particular intent or issue (e.g., paying an existing bill).

In the scenario illustrated in FIG. 4A, the user 108 has not provided their authorization to being recorded during the communications session between the user 108 and the one or more agents (e.g., the agent bot 116, the one or more live agents 106, etc.). For instance, in response to a prompt from the agent bot 116 for the user 108 to provide their affirmative consent to being recorded during the communications session, the user 108 may respond with an indication that they do not wish to be recorded. As another illustrative example, the user 108 may ignore the prompt from the agent bot 116 such that, after a pre-defined period of time has elapsed without a response, the agent bot 116 may automatically determine that the user 108 has failed to provide their affirmative consent to being recorded. This failure to provide an affirmative consent may result in user communications 406 not being recorded during the communications session. In some instances, the conversation recording system 104 may never record user communications 406 regardless of the user's geographic location or any other existing regulations or other privacy restrictions. Further, in some instances, based on any applicable recording restrictions (based on geographic location, regulations, etc.), the conversation recording system 104 may determine that recording of user communications 406 is prohibited and may not prompt the user 108 to provide their affirmative consent to being recorded, opting instead to forego recording user communications 406.

The conversation recording system 104 may record the communications session between the user 108 and the one or more agents (e.g., the agent bot 116, the one or more live agents 106, etc.) subject to the applicable recording restrictions, as the user 108 has failed to provide their affirmative consent to being recorded during the communications session. As illustrated in FIG. 4A, the resulting recording of the conversation (e.g., recorded conversation 404) may only include the communications exchanged by the live agent 106, omitting the user communications 406 provided by the user 108 in the original conversation 402.

To generate the recorded conversation 404, the conversation recording system 104 may implement a language processing algorithm that may automatically, and in real-time, process any communications between the user 108 and the one or more agents as these communications are exchanged in order to isolate the user and live agent communications. For instance, as noted above, the language processing algorithm may be dynamically trained to automatically identify voice signatures or other audial signatures that may uniquely correspond to the user 108 and the one or more agents. For each newly received communication, the language processing algorithm may automatically process the communication to generate a voice signature corresponding to the communication and compare this voice signature to the known voice signatures associated with the user 108 and the one or more agents. In some instances, the language processing algorithm may determine the purpose of the communication and determine whether it corresponds to the user 108 or to an agent. The language processing algorithm, in some examples, may obtain known voice signatures corresponding to the one or more agents engaged in the communications session to identify, in real-time any agent communications exchanged during the communications session. Any communications that do not correspond to these known voice signatures may be deemed as belonging to the user 108. If the communications session is facilitated through distinct communications channels (e.g., a first communications channel corresponds to the user 108, a second communications channel corresponds to the live agent 106, etc.), the language processing algorithm may automatically ignore the communications channel associated with the user 108 while automatically recording, in real-time, the communications channel associated with the one or more agents.

As illustrated in FIG. 4A, the resulting recorded conversation 404 between the user 108 and the one or more agents may only include the agent communications exchanged during the communications session. The recorded conversation 404 may include, in place of the user communications 406, white noise or other indication of removal of these user communications 406 from the recorded conversation 404. Alternatively, the recorded conversation 404 may be condensed such that agent communications are recorded without any gaps between individual agent communications. In an embodiment, the recorded conversation 404 can include metadata that can be used to indicate that the recorded conversation 404 only includes agent communications as a result of one or more recording restrictions. Further, the recorded conversation 404, through this metadata, may include timestamps corresponding to each of the agent communications exchanged during the communications session and included the recording, as well as timestamps corresponding to the beginning and end of the communications session.

In an alternative scenario, as illustrated in FIG. 4B, the user 108 has provided their affirmative consent to being recorded during the communications session. For instance, in response to a prompt from the agent bot 116 for the user 108 to provide their affirmative consent to being recorded during the communications session, the user 108 has provided their affirmative consent. In some instances, based on the geographic location or jurisdiction of the user 108, the conversation recording system 104 may determine that the user's affirmative consent is not required in order to record the user's communications during the communications session. The original conversation 408 may be similar to the original conversation 402 described above. For instance, the original conversation 408 may also begin with the user 108, through a user communication 406, requesting to pay their current bill, affirming the live agent's inquiry as to whether the user 108 would like to make a payment and provide their payment information, and providing feedback indicating that the live agent's performance was satisfactory and resolved the user's particular intent or issue.

The recorded conversation 410 corresponding to the communications session between the user 108 and the one or more agents, as result of the user's affirmative consent to being recorded, may include both the agent communications and user communications 406 exchanged during the communications session. The recorded conversation 410 may include metadata that may be used to uniquely identify the recorded conversation 410 and the properties associated with the recorded conversation 410. The metadata associated with the recorded conversation 410 may include timestamps corresponding to each of the communications exchanged during the communications session and included the recording, as well as timestamps corresponding to the beginning and end of the recorded conversation 410.

As noted above, in an embodiment, if the user 108 previously provided their affirmative consent to being recorded during a communications session, the conversation recording system 104 can continue to monitor the communications session in real-time as communications are exchanged between the user 108 and the one or more agents to determine whether the user 108 has revoked their previously provided affirmative consent. In the scenario illustrated in FIG. 4C, the user 108 has provided their affirmative consent to being recorded during the communications session. Further, the original conversation 412 may be similar to the original conversations 402 and 408 described above. For instance, the original conversation 412 may also begin with the user 108, through a user communication 414, requesting to pay their current bill. However, in response to an agent communication indicating the user's current balance and inquiring as to how the user 108 would like to submit their payment, the user 108, through a user communication 416, may ask the agent 106 to stop recording them as the user 108 is uncomfortable with being recorded. The user communication 416, thus, may serve as a revocation of the user's previously provided affirmative consent to being recorded.

The conversation recording system 104, through the aforementioned language processing algorithm, may automatically process the user communication 416 in real-time when the user communication 416 is exchanged to automatically detect any anchor terms or phrases that may correspond with a request to cease recording of user communications. For example, the language processing algorithm may detect, from the user communication 416, the anchor phrases "stop recording" and "don't feel comfortable." Based on these anchor phrases, the language processing algorithm may automatically determine that the user 108 has revoked their previously provided affirmative consent to being recorded. Further, the language processing algorithm may automatically determine that the reason for the user's request is that the user 108 no longer feels comfortable with being recorded during the communications session. This feedback from the user 108 may be used for various analytics, which may be used to improve agent communication with users during communications sessions, as described herein.

In an embodiment, if the user 108 revokes their affirmative consent to being recorded during the communications session, the conversation recording system 104 ceases to record any subsequent user communications exchanged during the communications session. For example, as illustrated in FIG. 4C, while the user 108 has exchanged subsequent user communications 418 after revoking their affirmative consent to being recorded, the conversation recording system 104 may omit these subsequent user communications 418, as well as the user communication 416 where the user 108 revoked their affirmative consent, from the recorded conversation 420. However, the recorded conversation 420 may still include the user communication 414, which was exchanged during the communications session prior to the user's revocation of their affirmative consent communicated in user communication 416. The recorded conversation 420 may include, in place of the user communications 416 and 418, white noise or other indication of removal of these user communications 416 and 418 from the recorded conversation 420. Alternatively, the recorded conversation 420 may be condensed such that agent communications exchanged immediately prior to the user communication 416 and after user communication 416 are recorded without any gaps between individual agent communications. In an embodiment, the recorded conversation 420 can include metadata that can be used to indicate that the recorded conversation 420 only includes agent communications after a particular timestamp (e.g., a timestamp corresponding to user communication 416) as a result of the user's revocation of their previously provided affirmative consent to being recorded. Further, the recorded conversation 420, through this metadata, may include timestamps corresponding to each of the user communications received prior to the user 108 having revoked their affirmative consent to being recorded (e.g., user communication 414, etc.) and agent communications exchanged during the communications session and included in the recording, as well as timestamps corresponding to the beginning and end of the communications session.

In an embodiment, if the user 108 revokes their affirmative consent to being recorded during the communications session, the conversation recording system 104 automatically removes all user communications from the recorded conversation 420. For instance, the conversation recording system 104, through the aforementioned language processing algorithm, may process in real-time the recorded conversation 420 to identify any previously recorded user communications (e.g., user communication 414, as illustrated in FIG. 4C). The language processing algorithm may remove any identified user communications from the recording according to any of the methods described above (e.g., replacement of user communications with white noise or other indicators denoting removal of user communications, condensing of the recording to include only agent communications, etc.). Further, if a transcription sub-system (such as the transcription sub-system 206 described above in connection with FIG. 2) generates a transcript of the recorded conversation 420 in real-time as communications are exchanged, the conversation recording system 104 may transmit an instruction to the transcription sub-system to remove any transcriptions of user communications from the transcript corresponding to the recorded conversation 420. The transcription sub-system, in response to this instruction, may modify the existing transcript corresponding to the recorded conversation 420 to remove any transcriptions of user communications exchanged during the communications session, such as user communication 414, which was received prior to the user's revocation of their affirmative consent to being recorded.

Figure 5:
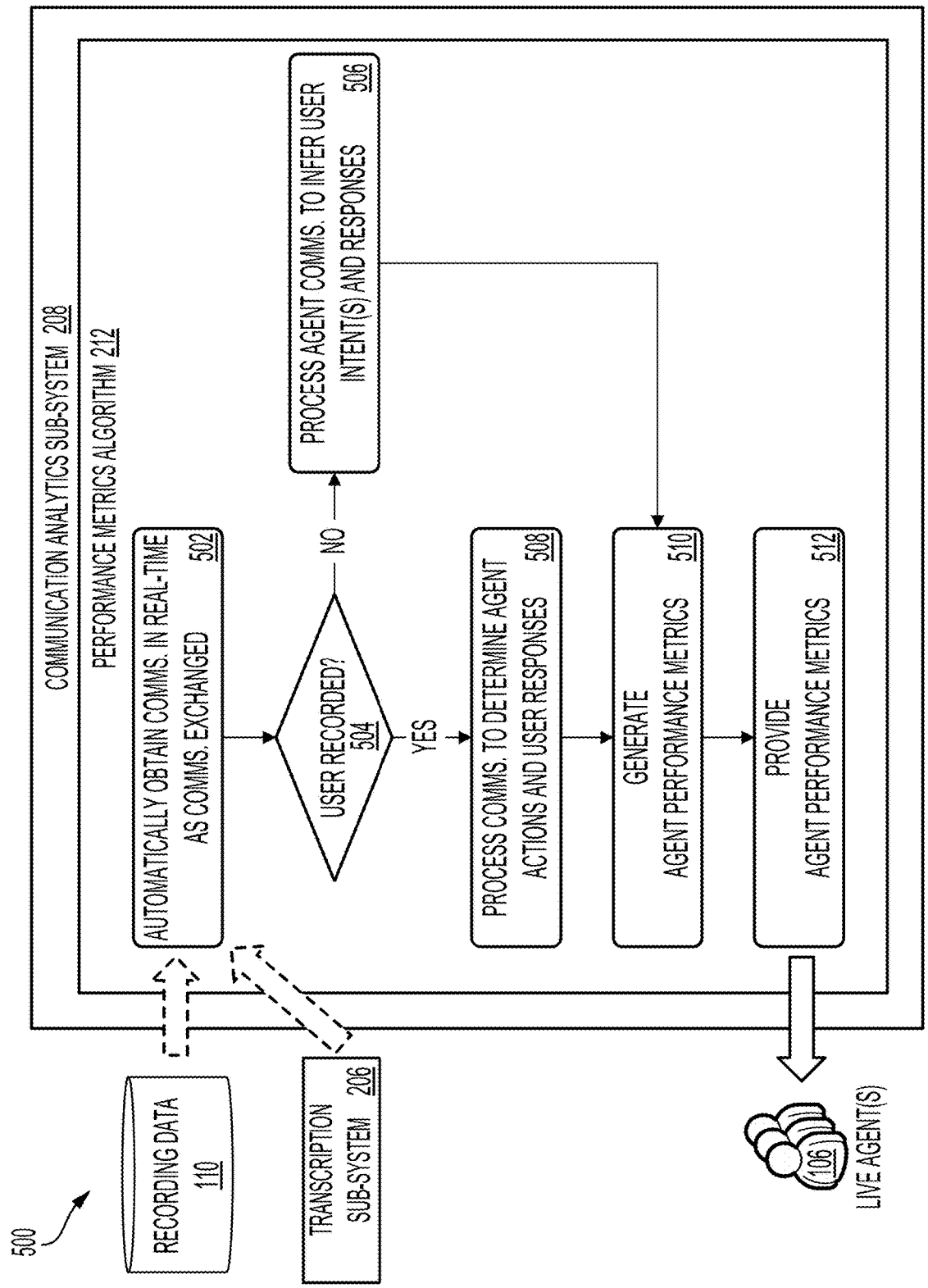
FIG. 5 shows an illustrative example of an environment in which a performance metrics algorithm generates performance metrics associated with an agent engaged in a communications session with a user based on recorded communications obtained subject to any specified recording restrictions in accordance with at least one embodiment.

FIG. 5 shows an illustrative example of an environment 500 in which a performance metrics algorithm 212 generates performance metrics associated with an agent 106 engaged in a communications session with a user based on recorded communications obtained subject to any specified recording restrictions in accordance with at least one embodiment. As noted above, the brand platform service implements a communication analytics sub-system 208 that can generate and provide various analytics corresponding to agent performance regardless of whether recordings include user communications or not. The communication analytics sub-system 208, to generate these various analytics, may implement a performance metrics algorithm 212, which may be dynamically trained to process, in real-time, recordings and/or transcripts corresponding to communications sessions between users and agents as communications are exchanged during these communications sessions to generate a set of agent performance metrics.

In the environment 500, the performance metrics algorithm 212 implemented by the communication analytics sub-system 208 may, at step 502, automatically obtain communications between a user and one or more agents (e.g., live agents 106, agent bots, etc.) in real-time as these communications are exchanged. As noted above, as the aforementioned transcription sub-system dynamically processes the recording of the communications session in real-time as communications are exchanged between the user and the one or more agents, the transcription sub-system may automatically generate a transcript of the recording. The transcript may include textual representations of the communications session, whereby each textual representation may correspond to either an agent communication or a user communication (if recorded) exchanged during the communications session. As the recording is updated in real-time to capture new communications exchanged over the communications session, the transcription sub-system may dynamically update the transcript of the communications session in real-time to incorporate the captured new communications. The recording and corresponding transcript of the communications session may be stored in the recording datastore 110, within which the recording and corresponding transcript may be updated in real-time as new communications exchanged over the communications session are processed in real-time by the transcription sub-system in real-time as these new communications are exchanged. The performance metrics algorithm 212 may automatically monitor and obtain, in real-time and as communications are exchanged over the communications session, the recording and corresponding transcript from the recording data 110 to obtain these communications.

In an embodiment, the performance metrics algorithm 212 can automatically obtain, in real-time and as communications are exchanged over a communications session, a transcription of a newly exchanged communication from the transcription sub-system 206 when the newly exchanged communication is received. As noted above, the transcription sub-system 206 may implement real-time ASR for generating, in real-time, individual transcriptions of each communication exchanged amongst the user, agent bots, and any live agent 106 engaged in the communications session. This may allow the transcription sub-system 206 to dynamically, and in real-time, generate transcriptions of communications exchanged during a communications session without need for recordings from the communication processing sub-system 202 (as described above in connection with FIG. 2). As the transcription sub-system 206 generates, in real-time, a transcription of a newly exchanged communication, the transcription sub-system 206 may automatically provide this transcription to the performance metrics algorithm 212.

At step 504, the performance metrics algorithm 212 may determine whether the obtained communications include any user recordings. As noted above, the recording and transcript associated with the particular communications session between the user and the one or more agents may be stored in the recording datastore 110 within a unique entry. This unique entry may include a unique identifier corresponding to the communications session, identification information corresponding to the user and the one or more agents involved in the communications session, any applicable recording restrictions associated with the communications session, any indications of affirmative consent provided by the user associated with the communications session, and the recording of the communications session. Further, the entry may include the transcript corresponding to the communications session. The performance metrics algorithm 212 may automatically evaluate this entry corresponding to the communications session to determine, from the entry, if the user has provided their affirmative consent to being recorded or any other indication that the user's communications exchanged during the communications session have been recorded (e.g., the user is in a jurisdiction that does not require affirmative consent for recording of user communications, etc.).

In some instances, the performance metrics algorithm 212 may automatically, and in real-time, process the transcript and recording of the communications session from the recording datastore 110 to determine whether the transcript and recording include any user communications. As noted above, the recording of the communications session may include metadata that can be used to indicate that the recording only includes agent communications as a result of one or more recording restrictions. Further, the recording of the communications session, through this metadata, may include timestamps corresponding to each of the agent communications exchanged during the communications session and included the recording, as well as timestamps corresponding to the beginning and end of the communications session. The transcript of the communications session may further include this metadata, whereby the textual representation of the communications session may include the aforementioned timestamps and any indications of the types of communications transcribed in the transcript (e.g., agent communications, user communications, etc.). Thus, based on an evaluation of the recording and/or transcript corresponding to the communications session, the performance metrics algorithm 212 may determine whether user communications have been recorded.

If the performance metrics algorithm 212 determines that the recording and/or transcript of the communications session does not include any user communications (e.g., the user has not provided their affirmative consent to being recorded, the user has revoked a previously provided affirmative consent to being recorded, the brand platform service by default does not record user communications, etc.), the performance metrics algorithm 212, at step 506, may process the agent communications included in the recording and/or transcript of the communications session to infer any user intents and responses. As noted above, the performance metrics algorithm 212 may be dynamically trained to identify and/or infer any implied elements corresponding to user communications from any recorded agent communications in the event that a recording does not include any user communications. For instance, the performance metrics algorithm 212 may be dynamically trained using a dataset that includes sample recordings that include, for each sample communications session, a recording that includes both user and agent communications and a recording that only includes agent communications. Further, the dataset may indicate, for each recording pairing, the expected elements corresponding to the user communications that are to be determined from evaluation of corresponding agent communications. The complete sample recording including both the user and agent communications may serve as the ground truth for the determination of the user's intent and sentiment. Through this training of the performance metrics algorithm 212, the performance metrics algorithm 212 may automatically process the agent communications included in the recording and/or transcript of the communications session to infer the user's original intent and their responses to these agent communications.

Alternatively, if the recording and/or transcript of the communications session includes both user and agent communications exchanged during the communications session, the performance metrics algorithm 212 may, at step 508, automatically process these communications to determine the user's intent or issue, the actions undertaken by the one or more agents to address this intent or issue, and the user's responses to these actions. For instance, the performance metrics algorithm 212 may dynamically, and in real-time, process the user communications included in the recording and/or transcript of the communications session to determine the user's intent or issue. Returning to the illustrative example illustrated in FIG. 4B, the performance metrics algorithm 212 may process the user communications 406 in the recorded conversation 410 to determine that the user's intent corresponds to the user's desire to pay their current bill. Further, from these user communications 406, the performance metrics algorithm 212 may determine that the user has provided appropriate responses to the agent's communications (e.g., affirming that they would like to make a payment in response to the agent's prompt, providing payment information when prompted, etc.) as well as provided feedback with regard to the agent's performance (e.g., "you've been great"). These user communications may provide additional context to the agent's communications exchanged during the communications session.

Regardless of whether the recording and/or transcript includes user communications exchanged during the communications session, the performance metrics algorithm 212, at step 510, may generate a set of agent performance metrics for each agent 106 involved in the communications session. For instance, the performance metrics algorithm 212 may calculate a set of performance metrics associated with the amount of effort required by a live agent 106 to address the user's intent or issue during a communications session, where a high score may correspond to a high amount of effort required to address a user's intent or issue, whereas a low score may correspond to a low amount of effort required by the live agent 106 to address the user's particular intent or issue. Further, the performance metrics algorithm 212 may automatically calculate a set of performance metrics corresponding to the level of emotion associated with the user during the communications session based on the particular intent/issue being addressed and any communications (or inferences made based on agent communications) that may denote the user's emotional state during the communications session. The performance metrics algorithm 212 may further determine the level of efficiency of the one or more agents in handling the user's particular intent or issue during the communications session to calculate an efficiency score for each of these one or more agents. This efficiency score may be determined based on the length of time required by an agent 106 to respond to user communications exchanged during the communications session. The performance metrics algorithm 212 may additionally generate a set of performance metrics corresponding to each agent's level of effectiveness in addressing the user's particular intent or issue during the communications session.

In some instances, in addition to the set of performance metrics, the performance metrics algorithm 212 may evaluate the agent communications exchanged during the communications session to determine whether the one or more agents engaged in the communications session have performed any required tasks. As noted above, the performance metrics algorithm 212 may be dynamically trained to perform a semantic analysis of these agent communications to identify one or more keywords that may be associated with particular tasks assigned to these one or more agents. Based on this semantic analysis of these agent communications, the performance metrics algorithm 212 may determine whether the one or more agents have performed particular tasks during the communications session, whether these particular tasks were performed appropriately (e.g., the tasks were performed according to user communications, the tasks were performed correctly, etc.). Based on this evaluation, the performance metrics algorithm 212 may provide one or more metrics corresponding to the performance of these tasks and/or any action items (e.g., remedial tasks, training recommendations, etc.) that may be provided to these one or more agents based on their performance (or lack thereof) of these required tasks.

At step 512, the performance metrics algorithm 212 may provide the set of performance metrics to the one or more live agents 106 that are/were engaged in the communications session with the user. For instance, the performance metrics algorithm 212 may automatically transmit a set of performance metrics specific for a particular agent 106 to the particular agent 106 as this set of performance metrics is generated and/or updated in real-time as new communications exchanged during the communications sessions the particular agent 106 is engaged in are processed by the performance metrics algorithm 212. In some instances, the performance metrics algorithm 212 may process the set of performance metrics, as well as the evaluations corresponding to agent performance of required tasks for particular intents or issues, to provide one or more recommendations for how to improve agent performance. These one or more recommendations may be provided to the one or more live agents 106 for improvement of their performance. The communication analytics sub-system 208 may track adherence by these one or more live agents 106 to the recommendations provided by the performance metrics algorithm 212, whereby the communication analytics sub-system 208 may correlate adherence to these recommendations to the performance of the one or more live agents 106 in providing a positive experience to users.

Figure 6:
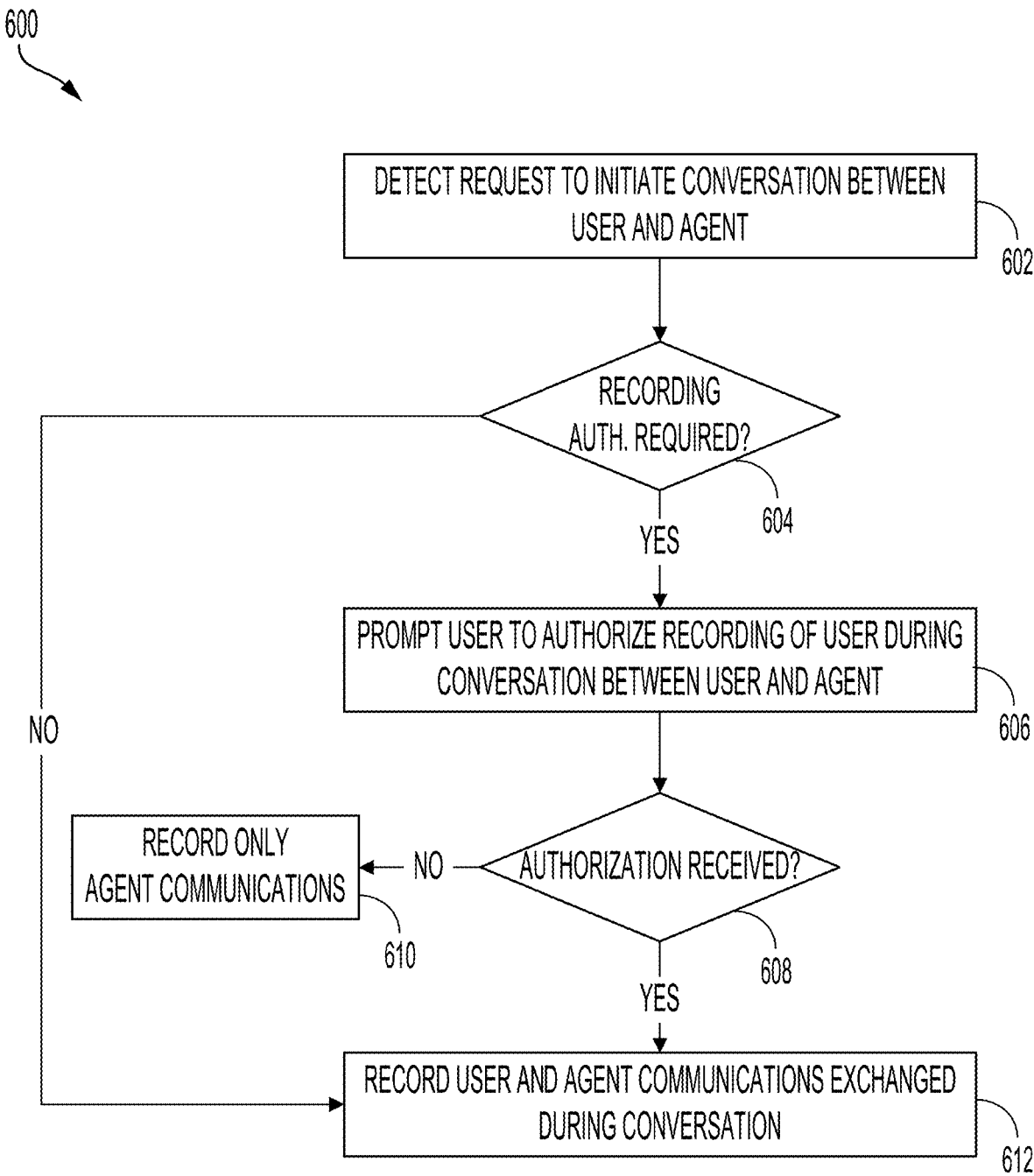
FIG. 6 shows an illustrative example of a process for initiating recording of a communications session according to user authorization regarding recording of user communications in accordance with at least one embodiment.

FIG. 6 shows an illustrative example of a process 600 for initiating recording of a communications session according to user authorization regarding recording of user communications in accordance with at least one embodiment. The process 600 may be performed by a conversation recording system implemented by the brand platform service described above. Further, certain operations associated with the process 600 may be performed by the conversation recording system in conjunction with an agent bot, which may be an automated process that is implemented or dynamically trained to communicate with users through communications sessions facilitated by the brand platform service in order to solicit user authorization for recording of user communications during these communications sessions.

At step 602, the conversation recording system may detect a request from a user to initiate a conversation (e.g., communications session) between the user and an agent that may be able to assist the user with regard to a particular intent or issue. For instance, the user may access the brand platform service to address an issue related to an appliance manufactured by a particular brand associated with the brand platform service. As another example, the user may access the brand platform service to provide payment for an outstanding balance associated with their account. The brand platform service, in response to this request, may engage the conversation recording system to process the request and initiate the communications session in order to allow for one or more agents to resolve the particular intent or issue communicated by the user to the brand platform service.

At step 604, the conversation recording system may determine whether the user's authorization is required for recording the user's communications exchanged during the communications session. As noted above, in some jurisdictions, an affirmative consent to record the user is required before the conversation recording system can record any user communications exchanged over the communications session. In these jurisdictions, the user may be required to provide their affirmative consent to being recording prior to the conversation recording system being permitted to record user communications exchanged during the communications session. To determine whether the user's authorization is required for recording their communications, the conversation recording system may determine the geographical location of the user. For instance, the conversation recording system may prompt the user to indicate their present geographic location (e.g., city, state, country, zip code, area code, physical address, etc.). Based on the user's response to this prompt, the conversation recording system may automatically determine whether the user's jurisdiction and determine whether this jurisdiction is subject to one or more recording restrictions whereby affirmative consent from the user is required. In some instances, the conversation recording system may automatically determine the user's location and, hence, their jurisdiction based on IP or MAC geolocation.

If the conversation recording system determines that the user's authorization to being recorded is not required, the conversation recording system, at step 612, may record any user and agent communications exchanged during the conversation in real-time and as these communications are exchanged. The conversation recording system may generate, in real-time, a transcript of the communications session between the user and the one or more agents as communications are exchanged over the communications session, as described above.

If the conversation recording system determines that the user's recording authorized is required in order for user communications to be recorded during the communications session, the conversation recording system may, at step 606, prompt the user to provide their authorization (e.g., affirmative consent) to being recorded during the conversation between the user and the one or more agents engaged in the conversation. For instance, the conversation recording system may implement an agent bot to solicit authorization from the user for recording the user's communications. The agent bot, through the communications session, may solicit the user to provide their authorization for recording user communications exchanged over the communications session. As an illustrative example, through the communications session, the agent bot may state "do you consent to having this conversation recorded for training purposes?" In response to this statement, the user may provide their affirmative response or rejection to the solicitation.

Once the agent bot has prompted the user to provide their authorization for recording user communications, the conversation recording system, at step 608, may automatically, and in real-time, process any subsequent user communications to determine whether the user has provided their affirmative consent to being recorded during the communications session. Referring to an earlier illustrative example, if the user has indicated, through a message exchanged during the communications session, that they do not wish to be recorded (e.g., "No, I don't want to be recorded."), the conversation recording system may automatically process, in real-time, this message to determine that the user has indicated that they do not wish to be recorded. Alternatively, if the user has indicated, through a message exchanged during the communications session, that they consent to being recorded (e.g., "Sure, you can record me."), the conversation recording system may automatically process, in real-time, this message to determine that the user has provided their affirmative consent to being recorded during the communications session.

If the conversation recording system determines that the user has not provided their affirmative consent to being recorded, the conversation recording system may, at step 610, record, in real-time, only the agent communications exchanged during the communications session as these communications are exchanged. For example, if the communications session is facilitated through separate communications channels for the user and the one or more agents (e.g., a first channel for the user and a second channel for the one or more agents), the conversation recording system may automatically identify and record the communications channel associated with the one or more agents while omitting the communications channel associated with the user. If the communications session is facilitated through a single communications channel (e.g., the user and the one or more agents share a communications channel during the communications session), the conversation recording system may process the communications exchanged between the user and the one or more agents in real-time as these communications are exchanged to identify any communications expressed by the user. For instance, using the aforementioned language processing algorithm, the conversation recording system may automatically identify user communications during the communications session and omit these communications from the recording of the communications session. For example, rather than recording the user communications, the conversation recording system may insert an audial null, void, or other signal in the recording to replace the user communications.

As noted above, to isolate and identify the user communications exchanged during the communications session, the conversation recording system may determine a voice signature corresponding to the user. For example, through the communication with the user to obtain their affirmative consent for being recorded during the communications session, the conversation recording system may process any user communications provided in response to the prompt for recording authorization to generate a voice signature corresponding to the user. This unique voice signature may be used by the conversation recording system to automatically identify user communications exchanged through the communications session and, according, omit these user communications from the recording of the communications session.

In some instances, the conversation recording system may additionally, or alternatively, maintain voice signatures for each of the agents associated with the brand platform service. For instance, each agent may be recorded to calculate a voice signature for the agent that may be made available during these communications sessions. During the communications session between the user and an agent, the conversation recording system may automatically retrieve the voice signature associated with the agent. Using this voice signature, the conversation recording system may automatically discern any user communications exchanged during the communications session, as these user communications may have a different voice signature compared to the known voice signature associated with the agent. Thus, in real-time, the conversation recording system can identify the user communications based on these user communications not corresponding to the known voice signature of the agent.

If the conversation recording system has obtained the user's affirmative consent to being recorded during the communications session, the conversation recording system, at step 612, may record both user and agent communications in real-time as these communications are exchanged during the communications session. As noted above, the conversation recording system may generate, in real-time, a transcript of the communications session between the user and the one or more agents as communications are exchanged over the communications session.

It should be noted that the process 600 may, in some instances, include additional and/or alternative steps that may be performed. For example, in addition to performing steps 604-612 to initiate recording of the communications session according to any recording restrictions and/or the user's affirmative consent (or lack thereof), the conversation recording system, through a transcription sub-system, may automatically, and in real-time, transcribe any communications exchanged during the communications session. As noted above, the transcription sub-system may be implemented with real-time ASR, through which the transcription sub-system may automatically receive, in real-time, any communications exchanged between the user and one or more agents (e.g., agent bot, live agent, etc.) as these communications are exchanged. The transcription sub-system, through the real-time ASR, may process a newly exchanged communication to generate an individual transcription of this newly exchanged communication. This transcription may be provided to a performance metrics algorithm, as described above, to generate a set of performance metrics and other conversation analytics that may be used to identify a set of characteristics associated with the user. The transcription may thus be generated by the transcription sub-system without need for a recording of the communications session.

Figure 7:
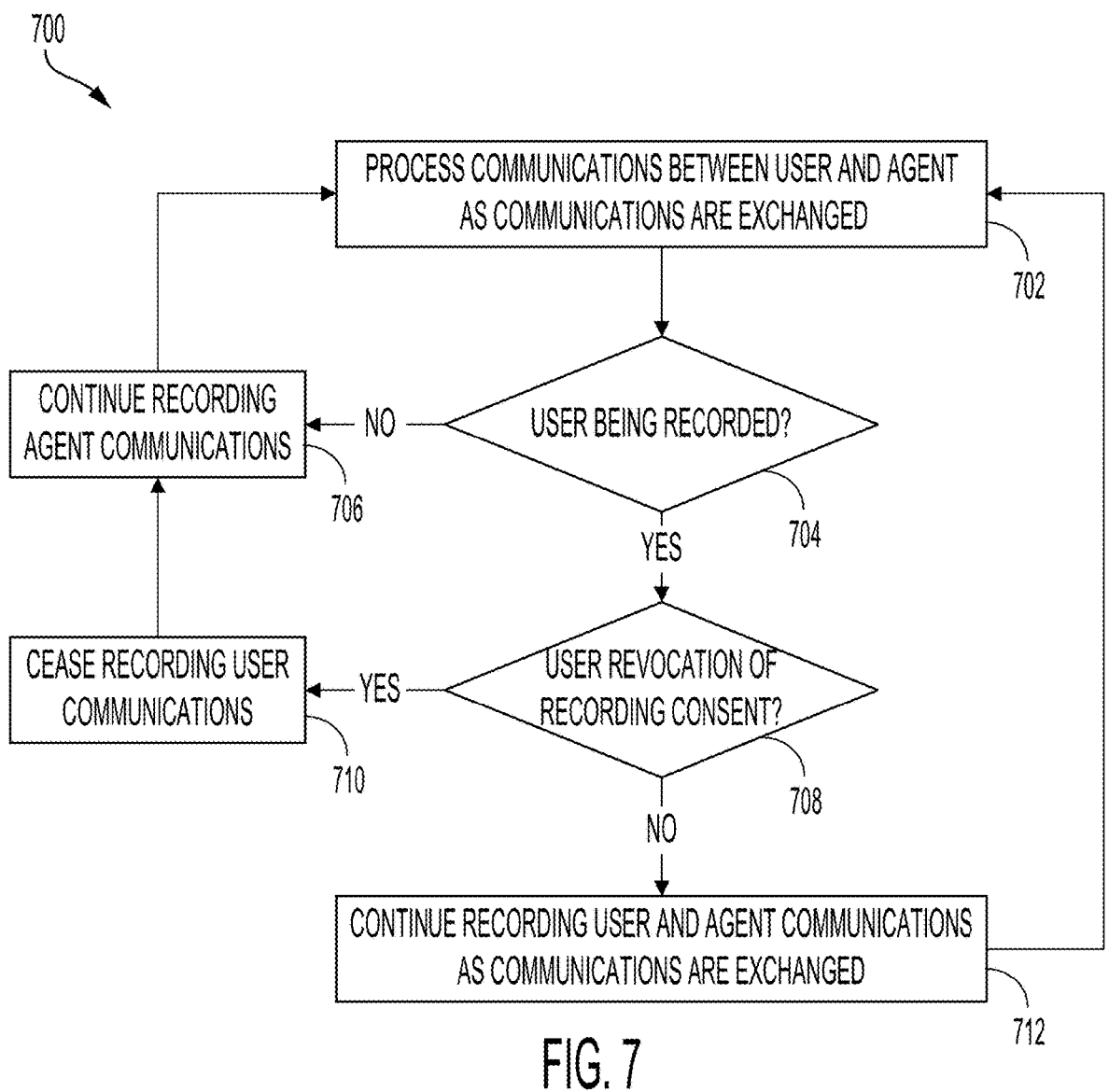
FIG. 7 shows an illustrative example of a process for modifying a recording of a communications session between a user and an agent in response to user revocation of recording consent during the communications session in accordance with at least one embodiment.

FIG. 7 shows an illustrative example of a process 700 for modifying a recording of a communications session between a user and an agent in response to user revocation of recording consent during the communications session in accordance with at least one embodiment. The process 700 may be performed by the aforementioned conversation recording system, which may continuously, and in real-time, monitor active communications sessions to detect user revocation of a previously provided affirmative consent.

At step 702, the conversation recording system may process, in real-time, communications between a user and one or more agents engaged in the communications session as these communications are exchanged. For instance, as communications are exchanged over the communications session, the conversation recording system may continuously, and in real-time, process these communications subject to any applicable recording restrictions to generate a recording of the communications session. This recording, as noted above, may be used to determine the performance of the one or more agents engaged in the communications session in order to identify any recommendations that may be provided to improve agent performance.

At step 704, as these communications are being processed, the conversation recording system may determine whether the user is currently being recorded. For instance, if the user has previously provided their affirmative consent to being recorded, or otherwise no recording restrictions are applicable (e.g., user consent is not required for recording user communications, etc.), the conversation recording system may automatically record both user and agent communications exchanged during the communications system in real-time and as these communications are exchanged. Alternatively, if the user has not provided their affirmative consent to being recorded (if required for recording user communications), or otherwise one or more restrictions with regard to recording user communications are applicable, the conversation recording system, at step 706, may continue to record only the agent communications exchanged during the communications session. Further, the conversation recording system may continue to process the communications between the user and the one or more agents in real-time and as these communications are exchanged to isolate and continue to record agent communications exchanged during the communications session, thereby restarting the process 700.

If the conversation recording system is recording, in real-time, user communications in addition to agent communications exchanged during the communications session as these communications are exchanged, the conversation recording system may determine, at step 708, whether the user has revoked their previously provided affirmative consent to being recorded. As noted above, if the communications session was established with the user's affirmative consent to being recorded during the communications session, the conversation recording system may continue to monitor the user communications, in real-time and as these user communications are exchanged to determine whether the user has revoked their consent to being recorded. For example, during the communications session, the conversation recording system may automatically process each user communication in real-time as it is exchanged to automatically detect any anchor terms or phrases that may correspond with a request to cease recording of user communications. Returning to an earlier illustrative example, if a user communication states, "Could you stop recording me?", the conversation recording system may identify the anchor phrase "stop recording" from the user communication. Based on the "stop recording" anchor phrase, the conversation recording system may automatically determine that the user has revoked their consent to being recorded during the communications session.

If the conversation recording system determines that the user has revoked their affirmative consent to being recorded (or the user has otherwise requested that they do not wish to be recorded during the communications session), the conversation recording system, at step 710, may cease recording user communications and, at step 712, continue to record, in real-time, any agent communications exchanged during the communications session as these communications are received. As noted above, if the user revokes their previously provided consent during the communications session, the conversation recording system automatically, and in real-time, removes any user communications previously recorded during the communications session prior to the user's revocation of their consent. For instance, the conversation recording system may access the present recording of the communications session to identify any user communications included in this present recording of the communications session between the user and the one or more agents. If the communications session is facilitated through separate communications channels for the user and the one or more agents, the conversation recording system may automatically identify the communications channel associated with the user and automatically discard any communications corresponding to this communications channel from the recording. If the communications session is facilitated through a single communications channel, the conversation recording system may process the previously recorded communications to detect any anchor terms or phrases that may particularly correspond to the user in the communications session and remove the corresponding communications from the recording. In some instances, the conversation recording system can use the aforementioned voice signatures corresponding to the user and the one or more agents to automatically detect the previously recorded user communications from the recording and automatically discard these previously recorded user communications from the recording.

If the user has not revoked their previously provided consent to being recorded during the communications session, the conversation recording system may, at step 712, continue to record both user and agent communications in real-time and exchanged during the communications session as these communications are exchanged. The conversation recording system may continue to monitor user communications, in real-time, as these user communications are exchanged to determine whether the user has revoked their consent to being recorded, thereby restarting the process 700.

Figure 8:
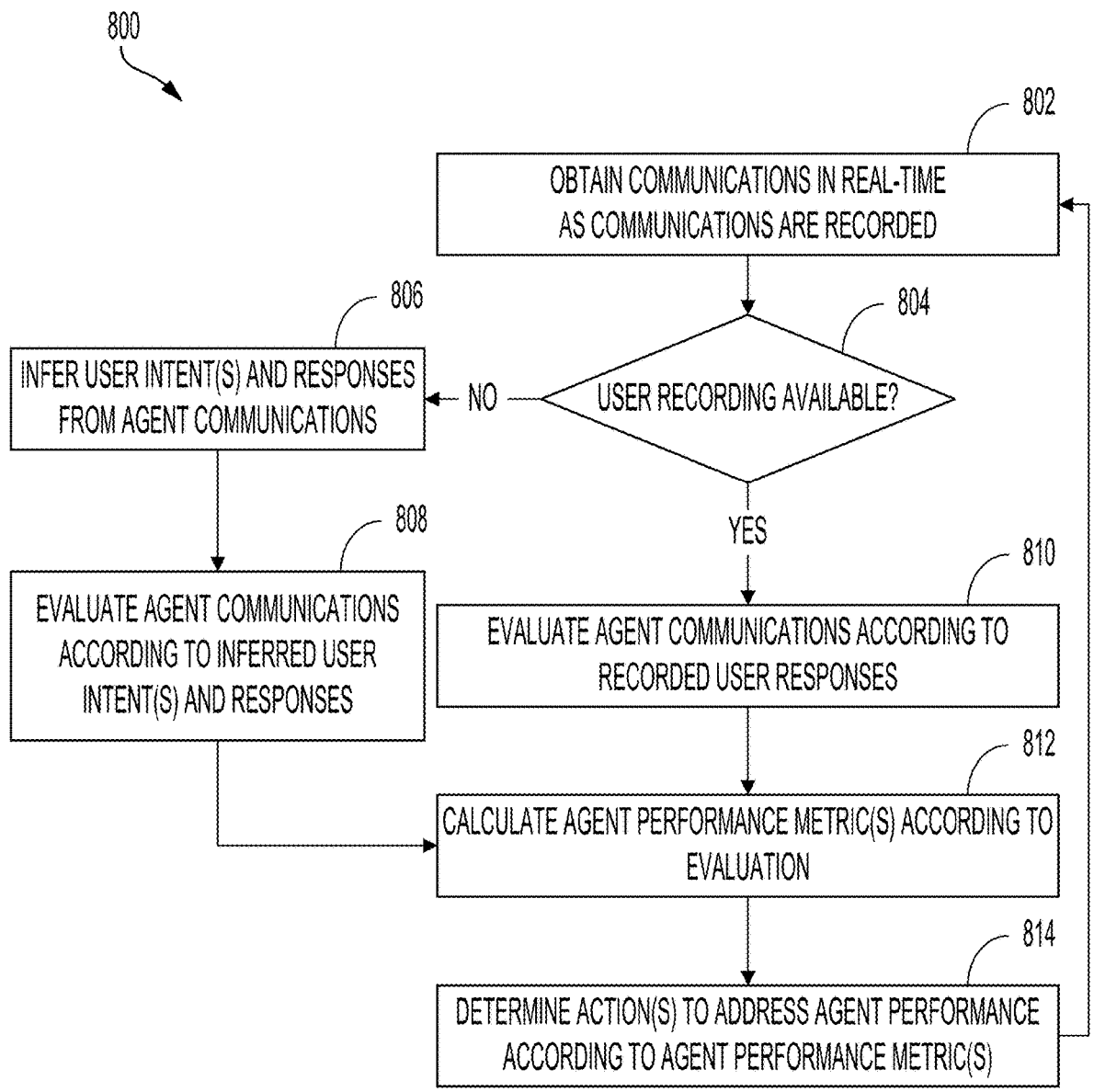
FIG. 8 shows an illustrative example of a process for evaluating a recording associated with a communications session between a user and an agent to calculate a set of performance metrics associated with the agent in accordance with at least one embodiment.

FIG. 8 shows an illustrative example of a process 800 for evaluating a recording associated with a communications session between a user and an agent to calculate a set of performance metrics associated with the agent in accordance with at least one embodiment. The process 800 may be performed by the aforementioned communication analytics sub-system implemented by the brand platform service to automatically, and in real-time, process recordings of communications sessions (regardless of whether these recordings include user communications or not) to generate a set of performance metrics for any agents engaged in these communications sessions and, based on this set of performance metrics, identify remedial actions that may be performed to improve agent performance. In some instances, the process 800 may be performed using real-time transcriptions of communications exchanged during the communications session as these communications are exchanged. As noted above, a transcription sub-system implemented with real-time ASR, may automatically and in real-time process a newly exchanged communication during an active communications session to generate a transcription of this newly exchanged communication. The transcription sub-system may automatically, and in real-time, provide this transcription to the communication analytics sub-system for processing, as described herein. It should be noted that, in some instances, the process 800 may be performed using a complete transcript of a terminated communications session (e.g., a communications session that has been concluded between a user and one or more agents).

At step 802, the communication analytics sub-system may obtain, in real-time, any communications exchanged during a communications session as these communications are being recorded by the aforementioned conversation recording system. As noted above, the conversation recording system may dynamically process the recording of the communications session in real-time as communications are exchanged between the user and the one or more agents to generate a transcript of the recording. The transcript may include textual representations of the communications session, whereby each textual representation may correspond to either an agent communication or a user communication exchanged (if recorded) during the communications session. As the recording is updated in real-time to capture new communications exchanged over the communications session, the conversation recording system may dynamically update the transcript of the communications session in real-time to incorporate the newly captured communications. The communication analytics sub-system may automatically monitor and obtain, in real-time and as communications are exchanged over the communications session, the recording and corresponding transcript of the communications session to obtain these communications.

At step 804, the communication analytics sub-system may determine whether any user communications have been recorded. As noted above, if the user has not provided their affirmative consent to being recorded during the communications session, or the brand platform service otherwise implements a policy or rule whereby no user communications are to be recorded, the recording of the communications session may be devoid of any user communications. Instead, the recording of the communications session may incorporate any agent communications exchanged during the communications session and recorded by the conversation recording system. To determine whether any user communications have been recorded, the communication analytics sub-system may automatically evaluate an entry corresponding to the communications session within the recording datastore to determine, from the entry, if the user has provided their affirmative consent to being recorded or any other indication that the user's communications exchanged during the communications session have been recorded. Additionally, or alternatively, the communication analytics sub-system may automatically, and in real-time, process the transcript and recording of the communications session from the recording datastore to determine whether the transcript and recording include any user communications.

If the communication analytics sub-system determines that the recording of the communications session does not include any user communications exchanged during the communications session, the communication analytics sub-system, at step 806, may infer the user's intent and responses communicated during the communications session based on the agent communications recorded in the recording of the communications session. For instance, the communication analytics sub-system may identify and/or infer any implied elements corresponding to user communications from any recorded agent communications included in the recording of the communications session. As an illustrative example, if an agent is recorded as having stated, "Let me look up your current bill to see what your existing balance is," the communication analytics sub-system may use NLP or other language processing algorithm(s) to identify the anchor phrases "look up," "current bill," and "existing balance." Based on these anchor phrases, the communication analytics sub-system may automatically determine that the user's intent is likely related to a request to pay an existing bill. As another illustrative example, if an agent is recorded as having stated, "I am truly sorry that you are having issues with your refrigerator," the communication analytics sub-system may use NLP or other language processing algorithm(s) to identify the anchor phrases "truly sorry," "having issues," and "your refrigerator." Based on these anchor phrases, the communication analytics sub-system may automatically determine that the user's intent is likely related to the user having trouble with their refrigerator. Further, using a sentiment analysis algorithm, the communication analytics sub-system may further infer that the user is experiencing a level of frustration as a result of this issue.

At step 808, the communication analytics sub-system may evaluate the agent communications recorded in the recording of the communications session according to the inferred user intents and responses. For example, if it is inferred, based on the agent communications, that the user has expressed an issue with their refrigerator and that the user continues to be frustrated throughout the communications session, the communication analytics sub-system may evaluate the agent communications recorded in the recording of the communications session to determine whether the agent has provided any responses that are germane to addressing the issue with the user's refrigerator. Further, the communication analytics sub-system may evaluate the agent communications to determine whether the agent has tried to reduce the user's frustrations inferred from these agent communications. As another illustrative example, if it is inferred that the user has submitted a request to pay their current bill, the communication analytics sub-system may evaluate the agent communications recorded in the recording of the communications session to determine whether the agent has indicated what the user's existing balance is, has prompted the user to indicate a source of payment for this existing balance, has indicated that the payment has been processed, and the like.

Returning to the determination made at step 804, if the communication analytics sub-system determines that the recording of the communications session includes a recording of user communications exchanged during the communications session, the communication analytics sub-system, at step 810, may evaluate the agent communications according to the recorded user responses. Similar to the operations described above in connection with step 808, the communication analytics sub-system may evaluate the agent communications recorded in the recording of the communications session to determine whether the agent has performed one or more actions that are germane to the user's intent or issue, as well as having conducted themselves in a professional manner or in a manner that resulted in an improved user sentiment during the communications session. However, as opposed to inferring the user's intent/issue and sentiment solely from the agent communications recorded in the recording of the communications session, the communication analytics sub-system may automatically process the recording of the user communications exchanged during the communications session to automatically identify the user's intent or issue and to determine the user's sentiment during the communications session.

At step 814, the communication analytics sub-system may calculate a set of performance metrics corresponding to the performance of the one or more agents engaged in the communications session. For instance, the communication analytics sub-system may calculate a set of performance metrics associated with the amount of effort required by an agent to address the user's intent or issue during a communications session, a set of performance metrics corresponding to the level of emotion associated with the user during the communications session based on the particular intent/issue being addressed and any communications (or inferences made based on agent communications) that may denote the user's emotional state during the communications session, a set of performance metrics corresponding to the level of efficiency of the one or more agents in handling the user's particular intent or issue during the communications session, a set of performance metrics corresponding to each agent's level of effectiveness in addressing the user's particular intent or issue during the communications session, and the like.

In addition to calculating this set of performance metrics, the communication analytics sub-system may evaluate the agent communications exchanged during the communications session to determine whether the one or more agents engaged in the communications session have performed any required tasks. For instance, the communication analytics sub-system may perform a semantic analysis of the agent communications recorded in the recording of the communications session to determine whether the one or more agents have performed one or more particular tasks during the communications session and whether these particular tasks were performed appropriately (e.g., the tasks were performed according to user communications, the tasks were performed correctly, etc.). Based on this evaluation, the communication analytics sub-system may provide one or more metrics corresponding to the performance of these tasks and/or any action items (e.g., remedial tasks, training recommendations, etc.) that may be provided to these one or more agents based on their performance (or lack thereof) of these required tasks.

At step 814, the communication analytics sub-system may determine one or more actions that may be performed to address agent performance according to the determined set of performance metrics. For instance, the communication analytics sub-system may generate one or more recommendations for how to improve the performance of an agent based on their performance during the communications session with the user. As an illustrative example, if the communication analytics sub-system determines, based on user communications or inferences made from agent communications during the communications session (if user communications were not recorded), that the agent took too long to respond to the user with regard to their particular intent or issue and was unable to identify the user's particular intent or issue in a timely manner, the communication analytics sub-system may recommend remedial training for the agent to better identify similar intents or issues using automated tools or other available resources. If such automated tools are already implemented, and the agent has not used these tools effectively (as evidenced through the communications exchanged during the communications session), the communication analytics sub-system may recommend that the agent be trained on how to utilize these tools effectively.

As illustrated in FIG. 8, the process 800 may be continuously performed as new communications are obtained in real-time and as these new communications are recorded. This may allow the communication analytics sub-system to continuously, and in real-time, update the set of performance metrics according to these newly obtained communications. Further, based on this updated set of performance metrics, the communication analytics sub-system may determine additional and/or alternative actions that may be performed to improve agent performance. In some instances, the continuous and real-time updating of the set of performance metrics may be used by the communication analytics sub-system to determine whether the corresponding one or more agents are adhering to the previously provided recommendations and to determine the impact of adhering to (or failing to adhere to) these recommendations. This evaluation may allow the communication analytics sub-system to better determine recommendations and actions that are more likely to improve agent performance during active communications sessions.

Figure 9:
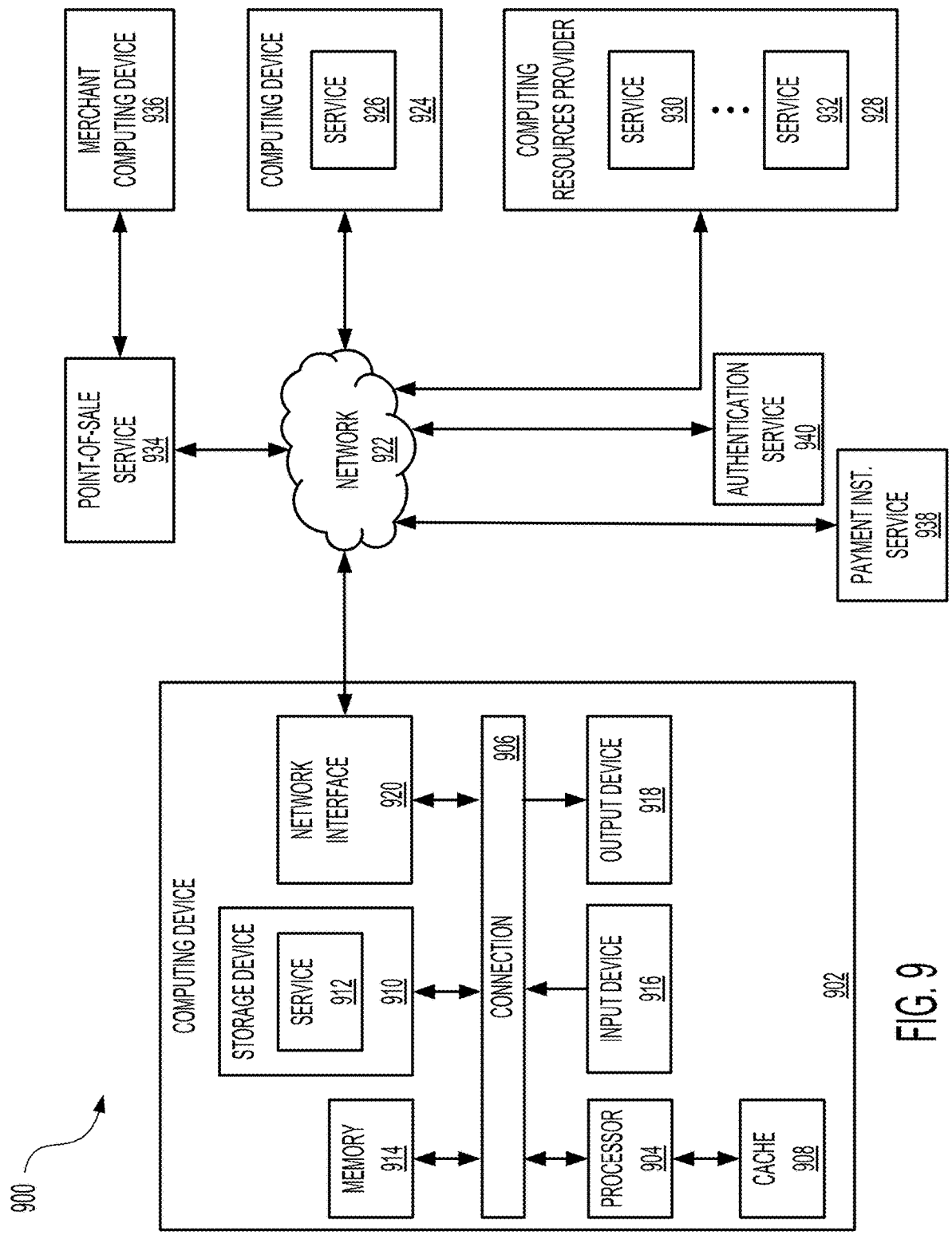
FIG. 9 shows an illustrative example of an environment in which various embodiments can be implemented.

FIG. 9 illustrates a computing system architecture 900 including various components in electrical communication with each other using a connection 906, such as a bus, in accordance with some implementations. Example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
dynamically processing, in real-time, communications exchanged during a communications session between a user and an agent to isolate user communications associated with the user, wherein the communications session is associated with an intent;
continuously generating a recording, wherein the recording includes the user communications and agent communications associated with the agent, and wherein the recording is generated according to an affirmative user consent;
detecting a revocation of the affirmative user consent during the communications session, wherein the revocation is communicated through a new user communication exchanged during the communications session;
automatically removing the user communications from the recording such that the recording is devoid of the user communications and any subsequent user communications exchanged during the communications session;
dynamically training a machine learning algorithm to generate a set of inferences corresponding to user sentiment associated with the intent, wherein the machine learning algorithm is dynamically trained using historic recordings corresponding to historic communications sessions between users and agents, and feedback corresponding to the historic communications sessions;
processing the agent communications from the recording through the machine learning algorithm to generate the set of inferences; and
generating agent analytics corresponding to the intent, wherein the agent analytics are generated based on the set of inferences and the recording.

2. The computer-implemented method of claim 1, wherein automatically removing the user communications from the recording further includes:
inserting one or more audial nulls in the recording to replace the user communications.

3. The computer-implemented method of claim 1, wherein generating the agent analytics includes:
identifying a set of agent training needs, wherein the set of agent training needs correspond to actions performable to improve agent responses to intents.

4. The computer-implemented method of claim 1, wherein detecting the revocation of the affirmative user consent further includes:
processing the new user communication as the new user communication is exchanged during the communications session; and
detecting one or more anchor terms corresponding to a request to cease recording of the user communications.

5. The computer-implemented method of claim 1, further comprising:
calculating a voice signature associated with the agent, wherein the voice signature is calculated during an onboarding process; and
identifying the user communications based on the user communications not corresponding to the voice signature.

6. The computer-implemented method of claim 1, further comprising:
processing the user communications to generate a unique voice signature associated with the user; and
using the unique voice signature to automatically identify and remove the user communications from the recording.

7. The computer-implemented method of claim 1, further comprising:
activating an agent bot, wherein the agent bot is implemented to solicit the affirmative user consent; and
receiving the affirmative user consent, wherein the affirmative user consent is provided in a response to a solicitation generated by the agent bot during the communications session.

8. A system, comprising:
one or more processors; and
memory storing thereon instructions that, as a result of being executed by the one or more processors, cause the system to:
dynamically process, in real-time, communications exchanged during a communications session between a user and an agent to isolate user communications associated with the user, wherein the communications session is associated with an intent;
continuously generate a recording, wherein the recording includes the user communications and agent communications associated with the agent, and wherein the recording is generated according to an affirmative user consent;
detect a revocation of the affirmative user consent during the communications session, wherein the revocation is communicated through a new user communication exchanged during the communications session;
automatically remove the user communications from the recording such that the recording is devoid of the user communications and any subsequent user communications exchanged during the communications session;
dynamically train a machine learning algorithm to generate a set of inferences corresponding to user sentiment associated with the intent, wherein the machine learning algorithm is dynamically trained using historic recordings corresponding to historic communications sessions between users and agents, and feedback corresponding to the historic communications sessions;
process the agent communications from the recording through the machine learning algorithm to generate the set of inferences; and
generate agent analytics corresponding to the intent, wherein the agent analytics are generated based on the set of inferences and the recording.

9. The system of claim 8, wherein the instructions that cause the system to automatically remove the user communications from the recording further cause the system to:
insert one or more audial nulls in the recording to replace the user communications.

10. The system of claim 8, wherein the instructions that cause the system to generate the agent analytics further cause the system to:
identify a set of agent training needs, wherein the set of agent training needs correspond to actions performable to improve agent responses to intents.

11. The system of claim 8, wherein the instructions that cause the system to detect the revocation of the affirmative user consent further cause the system to:
process the new user communication as the new user communication is exchanged during the communications session; and
detect one or more anchor terms corresponding to a request to cease recording of the user communications.

12. The system of claim 8, wherein the instructions further cause the system to:
calculate a voice signature associated with the agent, wherein the voice signature is calculated during an onboarding process; and
identify the user communications based on the user communications not corresponding to the voice signature.

13. The system of claim 8, wherein the instructions further cause the system to:
process the user communications to generate a unique voice signature associated with the user; and
use the unique voice signature to automatically identify and remove the user communications from the recording.

14. The system of claim 8, wherein the instructions further cause the system to:
activate an agent bot, wherein the agent bot is implemented to solicit the affirmative user consent; and
receive the affirmative user consent, wherein the affirmative user consent is provided in a response to a solicitation generated by the agent bot during the communications session.

15. A non-transitory computer-readable storage medium storing thereon executable instructions that, as a result of being executed by one or more processors of a computer system, cause the computer system to:
dynamically process, in real-time, communications exchanged during a communications session between a user and an agent to isolate user communications associated with the user, wherein the communications session is associated with an intent;
continuously generate a recording, wherein the recording includes the user communications and agent communications associated with the agent, and wherein the recording is generated according to an affirmative user consent;
detect a revocation of the affirmative user consent during the communications session, wherein the revocation is communicated through a new user communication exchanged during the communications session;

automatically remove the user communications from the recording such that the recording is devoid of the user communications and any subsequent user communications exchanged during the communications session;

dynamically train a machine learning algorithm to generate a set of inferences corresponding to user sentiment associated with the intent, wherein the machine learning algorithm is dynamically trained using historic recordings corresponding to historic communications sessions between users and agents, and feedback corresponding to the historic communications sessions;

process the agent communications from the recording through the machine learning algorithm to generate the set of inferences; and generate agent analytics corresponding to the intent, wherein the agent analytics are generated based on the set of inferences and the recording.

16. The non-transitory computer-readable storage medium of claim 15, wherein the executable instructions that cause the computer system to automatically remove the user communications from the recording further cause the computer system to:

insert one or more audial nulls in the recording to replace the user communications.

17. The non-transitory computer-readable storage medium of claim 15, wherein the executable instructions that cause the computer system to generate the agent analytics further cause the computer system to:

identify a set of agent training needs, wherein the set of agent training needs correspond to actions performable to improve agent responses to intents.

18. The non-transitory computer-readable storage medium of claim 15, wherein the executable instructions that cause the computer system to detect the revocation of the affirmative user consent further cause the computer system to:

process the new user communication as the new user communication is exchanged during the communications session; and detect one or more anchor terms corresponding to a request to cease recording of the user communications.

19. The non-transitory computer-readable storage medium of claim 15, wherein the executable instructions further cause the computer system to:

calculate a voice signature associated with the agent, wherein the voice signature is calculated during an onboarding process; and identify the user communications based on the user communications not corresponding to the voice signature.

20. The non-transitory computer-readable storage medium of claim 15, wherein the executable instructions further cause the computer system to:

process the user communications to generate a unique voice signature associated with the user; and use the unique voice signature to automatically identify and remove the user communications from the recording.

21. The non-transitory computer-readable storage medium of claim 15, wherein the executable instructions further cause the computer system to:

activate an agent bot, wherein the agent bot is implemented to solicit the affirmative user consent; and receive the affirmative user consent, wherein the affirmative user consent is provided in a response to a solicitation generated by the agent bot during the communications session.

\* \* \* \* \*